US011374624B2

(12) United States Patent
Deutsch et al.

(10) Patent No.: US 11,374,624 B2
(45) Date of Patent: *Jun. 28, 2022

(54) DISTRIBUTED ANTENNA NETWORKS FOR WIRELESS COMMUNICATION BY WIRELESS DEVICES

(71) Applicant: Pivotal Commware, Inc., Kirkland, WA (US)

(72) Inventors: Brian Mark Deutsch, Issaquah, WA (US); Shannon Lee Hitchen, Renton, WA (US); Alexander Remley Katko, Seattle, WA (US)

(73) Assignee: Pivotal Commware, Inc., Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/112,940

(22) Filed: Dec. 4, 2020

(65) Prior Publication Data

US 2021/0159945 A1 May 27, 2021

Related U.S. Application Data

(63) Continuation of application No. 16/049,630, filed on Jul. 30, 2018, now Pat. No. 10,862,545.

(51) Int. Cl.
*H04B 7/024* (2017.01)
*H04B 7/06* (2006.01)
(Continued)

(52) U.S. Cl.
CPC .......... *H04B 7/024* (2013.01); *H04B 7/0608* (2013.01); *H04B 17/345* (2015.01); *G06N 5/04* (2013.01); *G06N 20/00* (2019.01); *H04L 67/10* (2013.01)

(58) Field of Classification Search
CPC .......... H04B 1/0475; H04B 2001/0425; H04B 1/0017; H04B 1/62; H04B 7/024;
(Continued)

(56) References Cited

U.S. PATENT DOCUMENTS

| 2,131,108 A | 9/1938 | Lindenblad |
| 6,133,880 A | 10/2000 | Grangeat et al. |

(Continued)

FOREIGN PATENT DOCUMENTS

| CN | 102948089 A | 2/2013 |
| CN | 106664124 A | 5/2017 |

(Continued)

OTHER PUBLICATIONS

Björn Ekman, Machine Learning for Beam Based Mobility Optimization in NR, Master of Science Thesis in Communication Systems, Department of Electrical Engineering, Linköping University, 2017 (Year: 2017).*

(Continued)

*Primary Examiner* — Aristocratis Fotakis
(74) *Attorney, Agent, or Firm* — John W. Branch; Branch Partners PLLC

(57) ABSTRACT

A platform that automates providing wireless communication between one or more of a plurality of antennas and a moving vehicle that is traveling along a path. One or more of the plurality of antennas are employed to detect wireless signals communicated by the vehicle and/or wireless devices for the vehicle's passengers. In one or more embodiments, characteristics of the detected wireless signals and the plurality of antennas is employed to select an antenna to provide wireless communication with the vehicle and/or wireless devices for the vehicle's passengers at a current location on the path.

20 Claims, 19 Drawing Sheets

(51) Int. Cl.
*H04B 17/345* (2015.01)
*G06N 5/04* (2006.01)
*H04L 67/10* (2022.01)
*G06N 20/00* (2019.01)

(58) Field of Classification Search
CPC .. H04B 17/345; H04B 7/0608; H04B 7/0617;
H04B 7/0695; H04B 7/088; H04B
7/0834; H04L 27/368; H04L 25/49; H03F
1/3258; H03F 1/3247; H03F 2201/3221;
H03F 2201/3227; H03F 2201/3231; H03F
2201/3233; H03F 1/3241; G01S 3/14;
G01S 5/0054; G01S 19/42; H01Q 21/061;
H01Q 3/24; H01Q 13/20; G06N 99/005
See application file for complete search history.

(56) References Cited

U.S. PATENT DOCUMENTS

| | | |
|---|---|---|
| 6,150,987 A | 11/2000 | Sole et al. |
| 7,084,815 B2 | 8/2006 | Phillips et al. |
| 7,205,949 B2 | 4/2007 | Turner |
| 9,356,356 B2 | 5/2016 | Chang et al. |
| 9,385,435 B2 | 7/2016 | Bily et al. |
| 9,450,310 B2 | 9/2016 | Bily et al. |
| 9,551,785 B1 | 1/2017 | Geer |
| 9,635,456 B2 | 4/2017 | Fenichel |
| 9,711,852 B2 | 7/2017 | Chen et al. |
| 9,806,414 B2 | 10/2017 | Chen et al. |
| 9,806,415 B2 | 10/2017 | Chen et al. |
| 9,806,416 B2 | 10/2017 | Chen et al. |
| 9,812,779 B2 | 11/2017 | Chen et al. |
| 9,955,301 B2 | 4/2018 | Markhovsky et al. |
| 10,033,109 B1 | 7/2018 | Gummalla et al. |
| 10,225,760 B1 | 3/2019 | Black |
| 10,313,894 B1 | 6/2019 | Desclos et al. |
| 10,431,899 B2 | 10/2019 | Bily et al. |
| 10,468,767 B1 | 11/2019 | McCandless et al. |
| 10,734,736 B1 | 8/2020 | McCandless et al. |
| 2002/0196185 A1 | 12/2002 | Bloy |
| 2003/0025638 A1 | 2/2003 | Apostolos |
| 2004/0038714 A1* | 2/2004 | Rhodes .............. H01Q 3/24 455/562.1 |
| 2004/0229651 A1* | 11/2004 | Hulkkonen .......... H01Q 3/06 455/562.1 |
| 2005/0237265 A1 | 10/2005 | Durham et al. |
| 2005/0282536 A1 | 12/2005 | McClure et al. |
| 2006/0025072 A1 | 2/2006 | Pan |
| 2007/0024514 A1 | 2/2007 | Phillips et al. |
| 2007/0147338 A1 | 6/2007 | Chandra et al. |
| 2007/0184828 A1 | 8/2007 | Majidi-Ahy |
| 2007/0202931 A1 | 8/2007 | Lee et al. |
| 2008/0039012 A1 | 2/2008 | McKay et al. |
| 2008/0181328 A1 | 7/2008 | Harel et al. |
| 2009/0176487 A1 | 7/2009 | DeMarco |
| 2009/0207091 A1 | 8/2009 | Anagnostou et al. |
| 2009/0296938 A1 | 12/2009 | Devanand et al. |
| 2010/0197222 A1 | 8/2010 | Scheucher |
| 2010/0248659 A1 | 9/2010 | Kawabata |
| 2010/0302112 A1 | 12/2010 | Lindenmeier et al. |
| 2011/0070824 A1 | 3/2011 | Braithwaite |
| 2011/0199279 A1 | 8/2011 | Shen et al. |
| 2011/0292843 A1 | 12/2011 | Gan et al. |
| 2012/0194399 A1 | 8/2012 | Bily et al. |
| 2013/0069834 A1 | 3/2013 | Duerksen |
| 2013/0231066 A1 | 9/2013 | Zander et al. |
| 2013/0303145 A1* | 11/2013 | Harrang ............ H04W 24/02 455/418 |
| 2013/0324076 A1* | 12/2013 | Harrang ........... H04W 28/0284 455/405 |
| 2014/0094217 A1 | 4/2014 | Stafford |
| 2014/0171811 A1 | 6/2014 | Lin et al. |
| 2014/0198684 A1 | 7/2014 | Gravely et al. |
| 2014/0266946 A1 | 9/2014 | Bily et al. |
| 2014/0269417 A1 | 9/2014 | Yu et al. |
| 2014/0293904 A1 | 10/2014 | Dai et al. |
| 2014/0308962 A1 | 10/2014 | Zhang et al. |
| 2014/0349696 A1 | 11/2014 | Hyde et al. |
| 2015/0109178 A1 | 4/2015 | Hyde et al. |
| 2015/0109181 A1 | 4/2015 | Hyde et al. |
| 2015/0116153 A1 | 4/2015 | Chen et al. |
| 2015/0131618 A1 | 5/2015 | Chen |
| 2015/0162658 A1 | 6/2015 | Bowers et al. |
| 2015/0222021 A1 | 8/2015 | Stevenson et al. |
| 2015/0229028 A1 | 8/2015 | Bily et al. |
| 2015/0236777 A1 | 8/2015 | Akhtar et al. |
| 2015/0276926 A1 | 10/2015 | Bowers et al. |
| 2015/0276928 A1 | 10/2015 | Bowers et al. |
| 2015/0288063 A1 | 10/2015 | Johnson et al. |
| 2015/0318618 A1 | 11/2015 | Chen et al. |
| 2015/0372389 A1 | 12/2015 | Chen et al. |
| 2016/0037508 A1 | 2/2016 | Sun |
| 2016/0079672 A1 | 3/2016 | Cerreno |
| 2016/0087334 A1 | 3/2016 | Sayama et al. |
| 2016/0149308 A1 | 5/2016 | Chen et al. |
| 2016/0149309 A1 | 5/2016 | Chen et al. |
| 2016/0149310 A1 | 5/2016 | Chen et al. |
| 2016/0164175 A1 | 6/2016 | Chen et al. |
| 2016/0174241 A1 | 6/2016 | Ansari et al. |
| 2016/0219539 A1 | 7/2016 | Kim et al. |
| 2016/0241367 A1 | 8/2016 | Irmer et al. |
| 2016/0269964 A1 | 9/2016 | Murray |
| 2016/0345221 A1 | 11/2016 | Axmon et al. |
| 2016/0365754 A1 | 12/2016 | Zeine et al. |
| 2016/0373181 A1* | 12/2016 | Black .................. H04W 16/28 |
| 2017/0118750 A1 | 4/2017 | Kikuma et al. |
| 2017/0127295 A1 | 5/2017 | Black et al. |
| 2017/0127296 A1 | 5/2017 | Gustafsson et al. |
| 2017/0127332 A1 | 5/2017 | Axmon et al. |
| 2017/0155192 A1 | 6/2017 | Black et al. |
| 2017/0155193 A1 | 6/2017 | Black et al. |
| 2017/0187123 A1 | 6/2017 | Black et al. |
| 2017/0187426 A1 | 6/2017 | Su et al. |
| 2017/0194704 A1* | 7/2017 | Chawgo ................ H01Q 3/04 |
| 2017/0195054 A1 | 7/2017 | Ashrafi |
| 2017/0238141 A1 | 8/2017 | Lindoff et al. |
| 2017/0339575 A1 | 11/2017 | Kim et al. |
| 2017/0367053 A1 | 12/2017 | Noh et al. |
| 2017/0373403 A1 | 12/2017 | Watson |
| 2018/0013193 A1* | 1/2018 | Olsen .................. H04B 1/38 |
| 2018/0027555 A1 | 1/2018 | Kim et al. |
| 2018/0066991 A1 | 3/2018 | Mueller et al. |
| 2018/0097286 A1 | 4/2018 | Black et al. |
| 2018/0177461 A1* | 6/2018 | Bell ..................... A61B 5/7425 |
| 2018/0219283 A1 | 8/2018 | Wilkins et al. |
| 2018/0227035 A1 | 8/2018 | Cheng et al. |
| 2018/0227445 A1 | 8/2018 | Minegishi |
| 2018/0233821 A1 | 8/2018 | Pham et al. |
| 2018/0270729 A1 | 9/2018 | Ramachandra et al. |
| 2018/0301821 A1 | 10/2018 | Black et al. |
| 2018/0337445 A1 | 11/2018 | Sullivan et al. |
| 2018/0368389 A1* | 12/2018 | Adams ................ A01M 29/06 |
| 2019/0020107 A1 | 1/2019 | Polehn et al. |
| 2019/0052428 A1 | 2/2019 | Chu et al. |
| 2019/0053013 A1 | 2/2019 | Markhovsky et al. |
| 2019/0067813 A1 | 2/2019 | Igura |
| 2019/0219982 A1* | 7/2019 | Klassen ............... G05B 19/406 |
| 2019/0221931 A1 | 7/2019 | Black et al. |
| 2019/0289482 A1 | 9/2019 | Black |
| 2019/0336107 A1* | 11/2019 | Hope Simpson ..... G06T 7/0012 |
| 2020/0186227 A1* | 6/2020 | Reider ................ H04B 7/0626 |
| 2020/0205012 A1* | 6/2020 | Bengtsson ........... H04B 7/0413 |
| 2020/0313741 A1 | 10/2020 | Zhu et al. |
| 2021/0234591 A1* | 7/2021 | Eleftheriadis ..... H04W 52/0206 |
| 2022/0014933 A1* | 1/2022 | Moon ................ H04W 16/225 |

FOREIGN PATENT DOCUMENTS

| | | |
|---|---|---|
| CN | 106797074 A | 5/2017 |
| JP | 61-1102 A | 1/1986 |
| JP | 936656 A | 2/1997 |
| JP | 2007081648 A | 3/2007 |
| JP | 2007306273 A | 11/2007 |

(56) References Cited

FOREIGN PATENT DOCUMENTS

| | | |
|---|---|---|
| JP | 2008-153798 A | 7/2008 |
| JP | 2012-175189 A | 9/2012 |
| JP | 2014207626 A | 10/2014 |
| JP | 2017-220825 A | 12/2017 |
| JP | 2018-173921 A | 11/2018 |
| KR | 10 2016 0113100 A | 9/2016 |
| WO | 2010104435 A1 | 9/2010 |
| WO | 2012050614 A1 | 4/2012 |
| WO | 2012161612 A1 | 11/2012 |
| WO | 2013023171 A1 | 2/2013 |
| WO | 2015196044 A1 | 12/2015 |
| WO | 2016044069 A1 | 3/2016 |
| WO | 2017014842 A1 | 1/2017 |
| WO | 2017193056 A1 | 11/2017 |
| WO | 2018179870 A1 | 10/2018 |

OTHER PUBLICATIONS

Eric J. Black, Holographic Beam Forming and MIMO, Pivotal Commware, Dec. 2017 (Year: 2017).*
Office Communication for U.S. Appl. No. 16/983,927 dated Jan. 6, 2021, pp. 1-8.
Office Communication for U.S. Appl. No. 16/846,670 dated Feb. 8, 2021, pp. 1-4.
Office Communication for U.S. Appl. No. 16/846,670 dated Feb. 10, 2021, pp. 1-11.
Office Communication for U.S. Appl. No. 16/846,670 dated Apr. 2, 2021, pp. 1-9.
Office Communication for U.S. Appl. No. 16/730,690 dated Apr. 8, 2021, pp. 1-11.
Office Communication for U.S. Appl. No. 17/177,131 dated Apr. 9, 2021, pp. 1-17.
Vu, Trung Kien et al., "Joint Load Balancing and Interference Mitigation in 5G Heterogeneous Networks," IEEE Transactions on Wireless Communications, 2017, vol. 16, No. 9, pp. 6032-6046.
Office Communication for U.S. Appl. No. 17/177,145 dated Apr. 19, 2021, pp. 1-11.
Office Communication for U.S. Appl. No. 15/925,612 dated Jun. 15, 2018, pp. 1-9.
U.S. Appl. No. 14/510,947, filed Oct. 9, 2014, pp. 1-76.
Office Communication for U.S. Appl. No. 16/049,630 dated Oct. 4, 2018, pp. 1-13.
Office Communication for U.S. Appl. No. 15/870,758 dated Oct. 1, 2018, pp. 1-12.
Office Communication for U.S. Appl. No. 16/136,119 dated Nov. 23, 2018, pp. 1-12.
Office Communication for U.S. Appl. No. 16/136,119 dated Mar. 15, 2019, pp. 1-8.
Office Communication for U.S. Appl. No. 16/292,022 dated Jun. 7, 2019, pp. 1-13,.
Office Communication for U.S. Appl. No. 16/049,630 dated Apr. 12, 2019, pp. 1-13.
Office Communication for U.S. Appl. No. 16/280,939 dated May 16, 2019, pp. 1-16.
Office Communication for U.S. Appl. No. 16/280,939 dated May 13, 2019, pp. 1-22.
Office Communication for U.S. Appl. No. 16/440,815 dated Jul. 17, 2019, pp. 1-16.
Office Communication for U.S. Appl. No. 16/358,112 dated May 15, 2019, pp. 1-17.
International Search Report and Written Opinion for International Application No. PCT/US2019/022942 dated Jul. 4, 2019, pp. 1-12.
Yurduseven, Okan et al., "Dual-Polarization Printed Holographic Multibeam Metasurface Antenna" Aug. 7, 2017, IEEE Antennas and Wireless Propagation Letters. pp. 10.1109/LAWP.2017, pp. 1-4.
International Search Report and Written Opinion for International Application No. PCT/US2019/022987 dated Jul. 2, 2019, pp. 1-13.
Office Communication for U.S. Appl. No. 16/280,939 dated Jun. 24, 2019, pp. 1-5.
Office Communication for U.S. Appl. No. 16/280,939 dated Jul. 18, 2019, pp. 1-7.
Office Communication for U.S. Appl. No. 16/049,630 dated Aug. 7, 2019, pp. 1-13.
Office Communication for U.S. Appl. No. 16/292,022 dated Sep. 23, 2019, pp. 1-9.
Office Communication for U.S. Appl. No. 16/268,469 dated Oct. 7, 2019, pp. 1-5.
Office Communication for U.S. Appl. No. 16/268,469 dated Sep. 10, 2019, pp. 1-11.
International Search Report and Written Opinion for International Application No. PCT/US2019/041053 dated Aug. 27, 2019, pp. 1-15.
Office Communication for U.S. Appl. No. 16/568,096 dated Oct. 24, 2019, pp. 1-10.
International Search Report and Written Opinion for International Application No. PCT/US2019/047093 dated Oct. 21, 2019, pp. 1-14.
Office Communication for U.S. Appl. No. 16/049,630 dated Dec. 9, 2019, pp. 1-13.
Office Communication for U.S. Appl. No. 16/440,815 dated Jan. 8, 2020, pp. 1-8.
Office Communication for U.S. Appl. No. 16/049,630 dated Mar. 6, 2020, pp. 1-14.
Office Communication for U.S. Appl. No. 16/049,630 dated Mar. 31, 2020, pp. 1-16.
Office Communication for U.S. Appl. No. 16/734,195 dated Mar. 20, 2020, pp. 1-9.
Office Communication for U.S. Appl. No. 16/846,670 dated Jun. 11, 2020, pp. 1-12.
Office Communication for U.S. Appl. No. 16/673,852 dated Jun. 24, 2020, pp. 1-11.
International Search Report and Written Opinion for Application No. PCT/US2020/016641 dated Apr. 14, 2020, pp. 1-12.
Gao, S.S. et al., "Holographic Artificial Impedance Surface Antenna Based on Circular Patch", 2018 International Conference on Microwave and Millimeter Wave Technology (ICMMT), 2018, pp. 1-9.
Nishiyama,Eisuke et al., "Polarization Controllable Microstrip Antenna using Beam Lead PIN Diodes", 2006 Asia-Pacific Microwave Conference, 2006, pp. 1-4.
International Search Report and Written Opinion for Application No. PCT/US2020/013713 dated Apr. 21, 2020, pp. 1-9.
Office Communication for U.S. Appl. No. 16/049,630 dated Aug. 19, 2020, pp. 1-18.
Office Communication for U.S. Appl. No. 16/730,932 dated Aug. 25, 2020, pp. 1-5.
Office Communication for U.S. Appl. No. 16/983,978 dated Aug. 31, 2020, pp. 1-7.
Office Communication for U.S. Appl. No. 16/983,978 dated Sep. 16, 2020, pp. 1-7.
Office Communication for U.S. Appl. No. 16/049,630 dated Oct. 15, 2020, pp. 1-16.
Office Communication for U.S. Appl. No. 16/983,978 dated Oct. 27, 2020, pp. 1-13.
International Search Report and Written Opinion for Application No. PCT/US2020/048806 dated Nov. 17, 2020, pp. 1-15.
Office Communication for U.S. Appl. No. 16/673,852 dated Nov. 25, 2020, pp. 1-8.
Office Communication for U.S. Appl. No. 16/846,670 dated Nov. 25, 2020, pp. 1-13.
International Search Report and Written Opinion for International Patent Application No. PCT/US2021/026400 dated Jul. 20, 2021, pp. 1-7.
Office Communication for U.S. Appl. No. 17/177,145 dated Aug. 3, 2021, pp. 1-16.
Office Communication for U.S. Appl. No. 17/177,131 dated Aug. 6, 2021, pp. 1-16.
International Search Report and Written Opinion for International Patent Application No. PCT/US2021/034479 dated Aug. 10, 2021, pp. 1-7.
Office Communication for U.S. Appl. No. 17/332,136 dated Sep. 2, 2021, pp. 1-9.

(56) References Cited

OTHER PUBLICATIONS

Office Communication for Chinese Patent Application No. 201980019925.1 dated Sep. 27, 2021, pp. 1-25.
Office Communication for U.S. Appl. No. 17/177,145 dated Oct. 14, 2021, pp. 1-5.
International Search Report and Written Opinion for International Patent Application No. PCT/US2021/043308 dated Nov. 2, 2021, pp. 1-8.
Office Communication for U.S. Appl. No. 17/177,131 dated Nov. 12, 2021, pp. 1-5.
Extended European Search Report for European Patent Application No. 19772471.9 dated Nov. 8, 2021, pp. 1-8.
Office Communication for U.S. Appl. No. 17/177,145 dated Nov. 16, 2021, pp. 1-16.
Office Communication for U.S. Appl. No. 17/177,131 dated Dec. 17, 2021, pp. 1-14.
Black, Eric J., "Holographic Beam Forming and MIMO," Pivotal Commware, 2017, pp. 1-8.
Björn, Ekman, "Machine Learning for Beam Based Mobility Optimization in NR," Master of Science Thesis in Communication Systems, Department of Electrical Engineering, Linköping University, 2017, pp. 1-85.

* cited by examiner

DISTRIBUTED ANTENNA NETWORKS FOR WIRELESS COMMUNICATION BY WIRELESS DEVICES

CROSS-REFERENCE TO RELATED APPLICATIONS

This Utility patent application is a Continuation of U.S. patent application Ser. No. 16/049,630 filed on Jul. 30, 2018, now U.S. Pat. No. 10,862,545 issued on Dec. 8, 2020, the benefit of the filing date of which is hereby claimed under 35 U.S.C. § 120 and the contents of which is further incorporated in entirety by reference.

TECHNICAL FIELD

The invention relates generally to employing a network of antennas distributed at locations on the surface of the earth to provide wireless communications between a network operations center (NOC) and a plurality of wireless devices. Further, in some embodiments, the antennas are distributed at locations on the earth that parallel a known physical location for pedestrians and/or a route for one or more types of vehicles that transport passengers on the earth's surface and/or above the earth in the atmosphere to provide wireless communication for wireless devices used by the pedestrians and/or passengers.

BACKGROUND

Wireless devices, such as mobile telephone devices, have become the primary mode of wireless communication worldwide. Initially, wireless communication networks enabled mobile devices to provide voice communication, text messages, and somewhat limited internet access. However, newer generations of wireless communication networks have increased bandwidth and lowered latency enough to provide substantially more services to mobile device users. These services may include purchasing products, paying invoices, streaming movies, playing video games, online learning, dating, and more. Also, for each new generation of wireless communication network, the frequency and strength of their wireless signals are generally increased to provide even more bandwidth with less latency to mobile devices.

Unfortunately, wireless device access to these new generation wireless communication networks is often inconsistent for pedestrians or passengers of a vehicle, such as an aircraft, boat, train, auto, or bus. Also, existing distributed antenna networks employed by next generation wireless communication networks are typically not optimized for wireless devices that are employed by passengers of quickly moving vehicles or pedestrians that are positioned at locations that interfere with wireless communication. For pedestrians, these locations may include building structures, geographic features, or other antennas that interfere with wireless communication. Thus, it can be can be difficult for users of wireless devices to access these new wireless communication networks even when such distributed antenna networks are available.

DESCRIPTION OF THE EMBODIMENTS

Figure 1A:
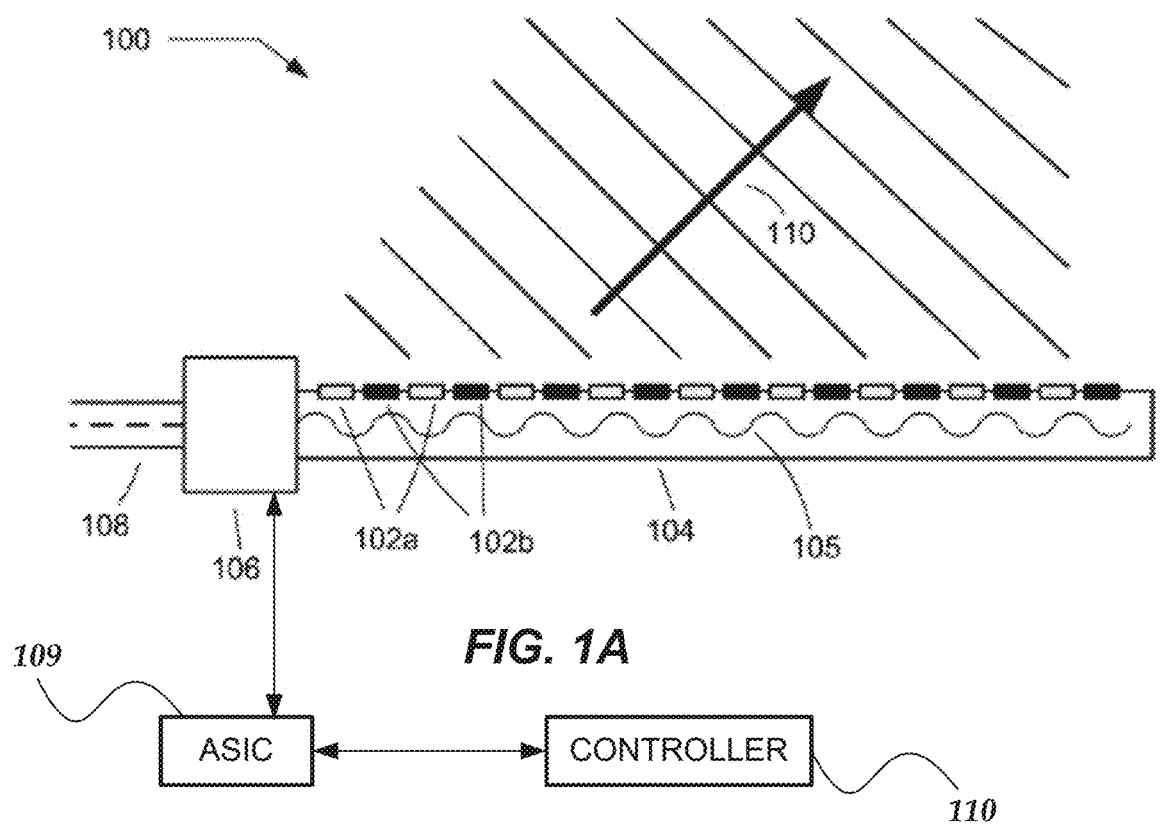
FIG. 1A shown an embodiment of an exemplary surface scattering antenna with multiple varactor elements arranged to propagate electromagnetic waves in such a way as to form an exemplary instance of holographic metasurface antennas (HMA)

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Similarly, the phrase "in another embodiment" as used herein does not necessarily refer to a different embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the term, "wireless device" refers to any stationary, non-stationary, or mobile wireless communication device that a user can employ to wirelessly communicate with one or more other users of other wireless communication devices or remotely located computing resources. A wireless device may enable a user to wirelessly access one or more remotely located computing resources over a network, e.g., websites, Application Programming Interfaces (APIs), databases, datastores, servers, clients, host computers, cloud computing resources, applications, or the like. In one or more embodiments, a wireless device may operate as one or more of a user terminal, mobile telephone, smart mobile telephone, pager, notebook computer, desktop computer, server computer, network appliance, base station, access point, switch, router, or the like.

The following briefly describes the embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards a platform that automates providing wireless communication between one or more of a plurality of surface scattering antennas and one or more wireless devices employed by users that are pedestrians and/or passengers of a vehicle that may be moving along a path on the earth's surface, in a body of water, or above the earth's surface in the atmosphere or beyond. One or more of the plurality of surface scattering antennas are employed to detect wireless signals communicated by the one or more wireless devices used by pedestrians and/or vehicle passengers. In one or more embodiments, characteristics of the detected wireless signals and the plurality of surface scattering antennas are employed to select a surface scattering antenna to provide optimal wireless communication with wireless devices for the pedestrians and/or passengers at a current location on the path. The direction and length of the path on the earth's surface, in a body of water, or above the earth's surface may be unknown or known based on other information, such as heuristics, flight plans, train track maps, road maps, shipping lanes, hiking maps, depth charts, or the like.

In one or more embodiments, a particular waveform, e.g., an antenna pattern for the selected surface scattering antenna is determined, to provide wireless communication with the wireless devices employed by a vehicle's passengers and/or pedestrians. The determined waveform is employed by the selected surface scattering antenna to improve wireless communication between the surface scattering antenna and the wireless devices. Also, in one or more embodiments, the improvement provided by the determined waveform includes adjusting one or more of a shape, phase, or a direction of wireless signals communicated by the surface scattering antenna to the wireless devices. Further, in one or more embodiments, a type of the vehicle includes a boat, an aircraft, a train, a truck, a bus, an automobile, a motorcycle, a bicycle, or the like. Also, the type of aircraft may include one or more of an airplane, a helicopter, a drone, a jet, a glider, a hot air balloon, a blimp, a kite, a kytoon, a rocket, a missile, or the like. Additionally, in one or more embodiments, the determined waveform may be employed to provide wireless communication with one or more wireless devices employed by the vehicle itself, which may be communicate separate from, or combined with, the wireless communication provided to the wireless devices used by the passengers.

In one or more embodiments, when a pedestrian and/or a vehicle's passengers travel to a new current location on the one or more paths, another surface scattering antenna is selected to provide optimal wireless communication with the wireless devices of the pedestrians and/or vehicle's passengers at the new current location on the one or more paths. Further, another waveform is dynamically determined for the selected other surface scattering antenna to provide wireless communication at the new current location with the wireless devices employed by the traveling vehicle's passengers and/or pedestrians. Also, the other determined waveform is employed to improve wireless communication between the other selected surface scattering antenna and one or more wireless devices employed by the vehicle's passengers and/or pedestrians by dynamically arranging one or more of a shape, phase, or a direction of wireless signals communicated by the other selected surface scattering antenna.

In one or more embodiments, the optimal selection of each surface scattering antenna is based on other information, including one or more of heuristics based on other vehicle passengers and/or other pedestrians that have previously traveled the one or more paths, surface scattering antenna characteristics, velocity, weather, events, distance, bandwidth, network capacity, events, load balancing information, topology of the plurality of surface scattering antennas, flight plan, shipping lanes, GPS information, in flight information, highway maps, train track maps, hiking trails, detected interference with wireless signals previously communicated by the selected surface scattering antenna, weather, maintenance events, machine learning models, or any other third party information.

In one or more embodiments, the determination of each waveform is performed remotely by a cloud computing system, a remote server computer, or the like over a network. Also, the arrangement of the surface scattering antenna pattern/waveform for the wireless signals communicated by each selected surface scattering antenna may be performed locally at a selected surface scattering antenna based on each corresponding determined waveform. Additionally, in one or more embodiments, the determination of each waveform may be performed by one or more computing resources located at one or more of the selected surface scattering antenna, edge computing resources, a remote computer system, or a cloud computing system.

In one or more embodiments, when interference in the wireless communication provided by one or more of the selected surface scattering antennas is detected, adjustments to the shape, direction, or phase are determined to dynamically compensate for the interference for the waveforms for each selected surface scattering antenna. For example, the dynamic compensation may take the form of one or more changes to the waveforms to mitigate interference caused by one or more of movement, temporary changes, and/or permanent changes in the physical environment where the selected surface scattering antennas are located. This movement and/or changes may include a tree that has grown too tall, a tree branch that moving back and forth in the wind, or a new building that interferes with the wireless communication provided by the selected surface scattering antennas, or the like. Also, a report is provided to identify the detected interference and each compensation adjustment provided for each waveform for each selected surface scattering antenna.

In one or more embodiments, when an imbalance in the loads of wireless communication provided by two or more of the selected surface scattering antennas is detected for substantially the same physical location, adjustments to the shape, direction, or phase are dynamically determined for the waveforms for each selected surface scattering antenna to compensate for the load imbalance. This compensation may provide for equalizing the loads on each selected surface scattering antenna based in part on their capacities, characteristics, performance, or the like. Also, a report is provided to identify the one or more load imbalances and the dynamic compensation adjustments for the two or more selected surface scattering antennas.

In one or more embodiments, one or more machine learning engines are employed to provide one or more models, recommendations, or predictions, which may be used to preselect each surface scattering antenna for one or more locations on a path that a vehicle is likely to travel, preselect each surface scattering antenna to provide wireless communication at a location where pedestrian's wireless user devices are likely to be positioned, preselect other determined waveforms provided to each selected surface scattering antenna, surface scattering antenna maintenance recommendations, surface scattering antenna upgrade recommendations, physical environment maintenance recommendations, predictions of loads for wireless communication provided by selected surface scattering antennas at a physical location for particular days, times or events, or the like.

Additionally, in one or more embodiments, the plurality of antennas are surface scattering antennas that provide beam forming. Also, one or more surface scattering antennas may be positioned at substantially the same physical location or within a same physical enclosure. Further, in one or more embodiments, the surface scattering antennas are may include one or more holographic metasurface antennas (HMAs) or the like.

In one or more embodiments, different wireless signals may be communicated by the one or more surface scattering antennas using different types of wireless communication protocols, such as 5G, 4G, 3G, 2G, LTE, TDMA, GPRS, CDMA, GSM, WiFi, WiMax, or the like. Also, these different types of wireless communication protocols may be employed for different types of services.

Additionally, in one or more embodiments, an HMA may use an arrangement of controllable elements to produce an object wave. Also, in one or more embodiments, the controllable elements may employ individual electronic circuits that have two or more different states. In this way, an object wave can be modified by changing the states of the electronic circuits for one or more of the controllable elements. A control function, such as a hologram function, can be employed to define a current state of the individual controllable elements for a particular object wave. In one or more embodiments, the hologram function can be predetermined or dynamically created in real time in response to various inputs and/or conditions. In one or more embodiments, a library of predetermined hologram functions may be provided. In the one or more embodiments, any type of HMA can be used to that is capable of producing the beams described herein.

Illustrated Operating Environment

FIG. 1A illustrates one embodiment of an HMA which takes the form of a surface scattering antenna 100 (i.e., a HMA) that includes multiple scattering elements 102a, 102b that are distributed along a wave-propagating structure 104 or other arrangement through which a reference wave 105 can be delivered to the scattering elements. The wave propagating structure 104 may be, for example, a microstrip, a coplanar waveguide, a parallel plate waveguide, a dielectric rod or slab, a closed or tubular waveguide, a substrate-integrated waveguide, or any other structure capable of supporting the propagation of a reference wave 105 along or within the structure. A reference wave 105 is input to the wave-propagating structure 104. The scattering elements 102a, 102b may include scattering elements that are embedded within, positioned on a surface of, or positioned within an evanescent proximity of, the wave-propagation structure 104. Examples of such scattering elements include, but are not limited to, those disclosed in U.S. Pat. Nos. 9,385,435; 9,450,310; 9,711,852; 9,806,414; 9,806,415; 9,806,416; and 9,812,779 and U.S. Patent Applications Publication Nos. 2017/0127295; 2017/0155193; and 2017/0187123, all of which are incorporated herein by reference in their entirety. Also, any other suitable types or arrangement of scattering elements can be used.

The surface scattering antenna may also include at least one feed connector 106 that is configured to couple the wave-propagation structure 104 to a feed structure 108 which is coupled to a reference wave source (not shown). The feed structure 108 may be a transmission line, a waveguide, or any other structure capable of providing an electromagnetic signal that may be launched, via the feed connector 106, into the wave-propagating structure 104. The feed connector 106 may be, for example, a coaxial-to-microstrip connector (e.g. an SMA-to-PCB adapter), a coaxial-to-waveguide connector, a mode-matched transition section, etc.

The scattering elements 102a, 102b are adjustable scattering elements having electromagnetic properties that are adjustable in response to one or more external inputs.

Adjustable scattering elements can include elements that are adjustable in response to voltage inputs (e.g. bias voltages for active elements (such as varactors, transistors, diodes) or for elements that incorporate tunable dielectric materials (such as ferroelectrics or liquid crystals)), current inputs (e.g. direct injection of charge carriers into active elements), optical inputs (e.g. illumination of a photoactive material), field inputs (e.g. magnetic fields for elements that include nonlinear magnetic materials), mechanical inputs (e.g. MEMS, actuators, hydraulics), or the like. In the schematic example of FIG. 1A, scattering elements that have been adjusted to a first state having first electromagnetic properties are depicted as the first elements 102a, while scattering elements that have been adjusted to a second state having second electromagnetic properties are depicted as the second elements 102b. The depiction of scattering elements having first and second states corresponding to first and second electromagnetic properties is not intended to be limiting: embodiments may provide scattering elements that are discretely adjustable to select from a discrete plurality of states corresponding to a discrete plurality of different electromagnetic properties, or continuously adjustable to select from a continuum of states corresponding to a continuum of different electromagnetic properties.

In the example of FIG. 1A, the scattering elements 102a, 102b have first and second couplings to the reference wave 105 that are functions of the first and second electromagnetic properties, respectively. For example, the first and second couplings may be first and second polarizabilities of the scattering elements at the frequency or frequency band of the reference wave. On account of the first and second couplings, the first and second scattering elements 102a, 102b are responsive to the reference wave 105 to produce a plurality of scattered electromagnetic waves having amplitudes that are functions of (e.g. are proportional to) the respective first and second couplings. A superposition of the scattered electromagnetic waves comprises an electromagnetic wave that is depicted, in this example, as an object wave 110 that radiates from the surface scattering antenna 100.

FIG. 1A illustrates a one-dimensional array of scattering elements 102a, 102b. It will be understood that two- or three-dimensional arrays can also be used. In addition, these arrays can have different shapes. Moreover, the array illustrated in FIG. 1A is a regular array of scattering elements 102a, 102b with equidistant spacing between adjacent scattering elements, but it will be understood that other arrays may be irregular or may have different or variable spacing between adjacent scattering elements. Also, Application Specific Integrated Circuit (ASIC) 109 is employed to control the operation of the row of scattering elements 102a and 102b. Further, controller 110 may be employed to control the operation of one or more ASICs that control one or more rows in the array.

Figure 1B:
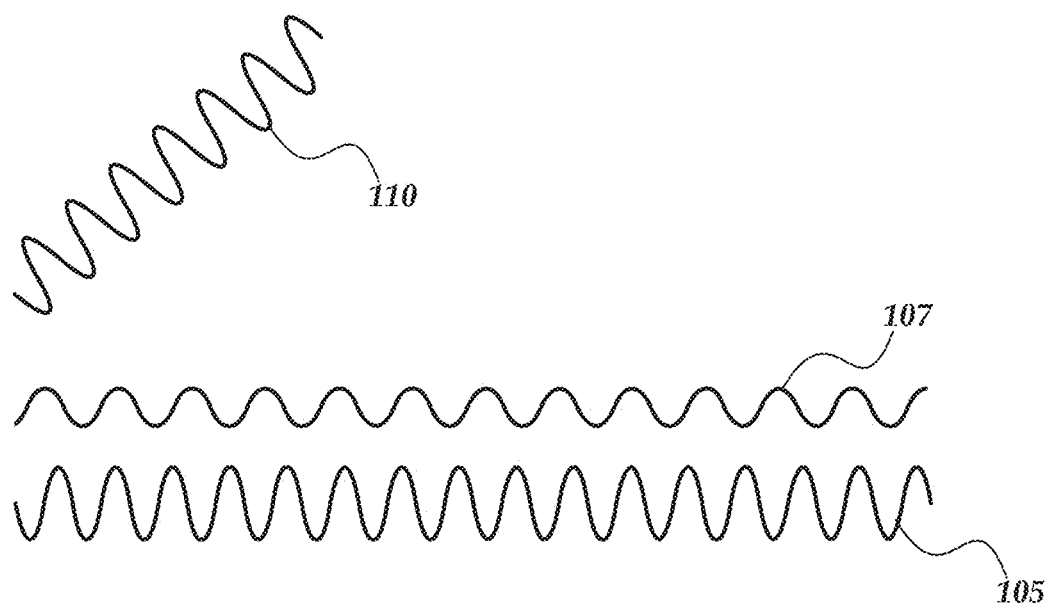
FIG. 1B shows a representation of one embodiment of a synthetic array illustrating a reference waveform and a hologram waveform (modulation function) that in combination provide an object waveform of electromagnetic waves.
Figure 1C:
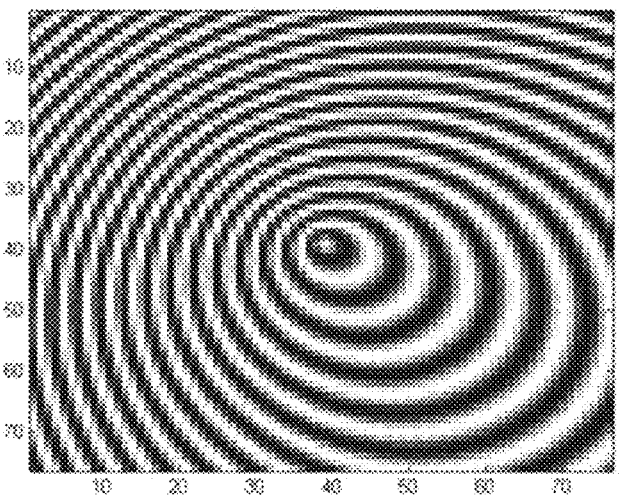
FIG. 1C shows an embodiment of an exemplary modulation function for an exemplary surface scattering antenna.
Figure 1D:
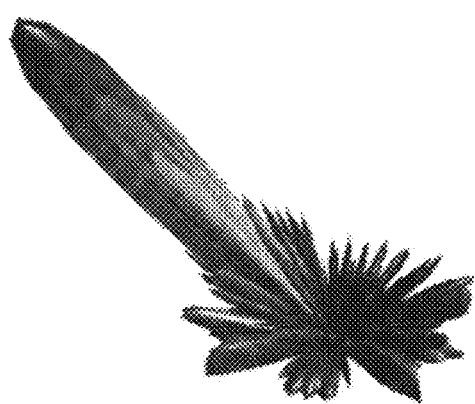
FIG. 1D shows an embodiment of an exemplary beam of electromagnetic waves generated by the modulation function of FIG. 1C.

The array of scattering elements 102a, 102b can be used to produce a far-field beam pattern that at least approximates a desired beam pattern by applying a modulation pattern 107 (e.g., a hologram function, H) to the scattering elements receiving the reference wave ($\psi_{ref}$) 105 from a reference wave source, as illustrated in FIG. 1B. Although the modulation pattern or hologram function 107 in FIG. 1B is illustrated as sinusoidal, it will be recognized non-sinusoidal functions (including non-repeating or irregular functions) may also be used. FIG. 1C illustrates one example of a modulation pattern and FIG. 1D illustrates one example of a beam generated using that modulation pattern.

In at least some embodiments, a computing system can calculate, select (for example, from a look-up table or database of modulation patterns) or otherwise determine the modulation pattern to apply to the scattering elements 102a, 102b receiving the RF energy that will result in an approximation of desired beam pattern. In at least some embodiments, a field description of a desired far-field beam pattern is provided and, using a transfer function of free space or any other suitable function, an object wave ($\psi_{obj}$) 110 at a surface scattering antenna's aperture plane can be determined that results in the desired far-field beam pattern being radiated. The modulation function (e.g., hologram function) can be determined which will scatter the reference wave 105 into the object wave 110. The modulation function (e.g., hologram function) is applied to scattering elements 102a, 102b, which are excited by the reference wave 105, to form an approximation of an object wave 110 which in turn radiates from the aperture plane to at least approximately produce the desired far-field beam pattern.

In at least some embodiments, the hologram function H (i.e., the modulation function) is equal the complex conjugate of the reference wave and the object wave, i.e., $\psi_{ref}^{*}\psi_{obj}$. In at least some embodiments, the surface scattering antenna may be adjusted to provide, for example, a selected beam direction (e.g. beam steering), a selected beam width or shape (e.g. a fan or pencil beam having a broad or narrow beam width), a selected arrangement of nulls (e.g. null steering), a selected arrangement of multiple beams, a selected polarization state (e.g. linear, circular, or elliptical polarization), a selected overall phase, or any combination thereof. Alternatively, or additionally, embodiments of the surface scattering antenna may be adjusted to provide a selected near field radiation profile, e.g. to provide near-field focusing or near-field nulls.

The surface scattering antenna can be considered a holographic beamformer which, at least in some embodiments, is dynamically adjustable to produce a far-field radiation pattern or beam. In some embodiments, the surface scattering antenna includes a substantially one-dimensional wave-propagating structure 104 having a substantially one-dimensional arrangement of scattering elements. In other embodiments, the surface scattering antenna includes a substantially two-dimensional wave-propagating structure 104 having a substantially two-dimensional arrangement of scattering elements. In at least some embodiments, the array of scattering elements 102a, 102b can be used to generate a narrow, directional far-field beam pattern, as illustrated, for example, in FIG. 1C. It will be understood that beams with other shapes can also be generated using the array of scattering elements 102a, 102b.

In at least some of the embodiments, the narrow far-field beam pattern can be generated using a holographic meta-surface antenna (HMA) and may have a width that is 5 to 20 degrees in extent. The width of the beam pattern can be determined as the broadest extent of the beam or can be defined at a particular region of the beam, such as the width at 3 dB attenuation. Any other suitable method or definition for determining width can be used.

Figure 2A:
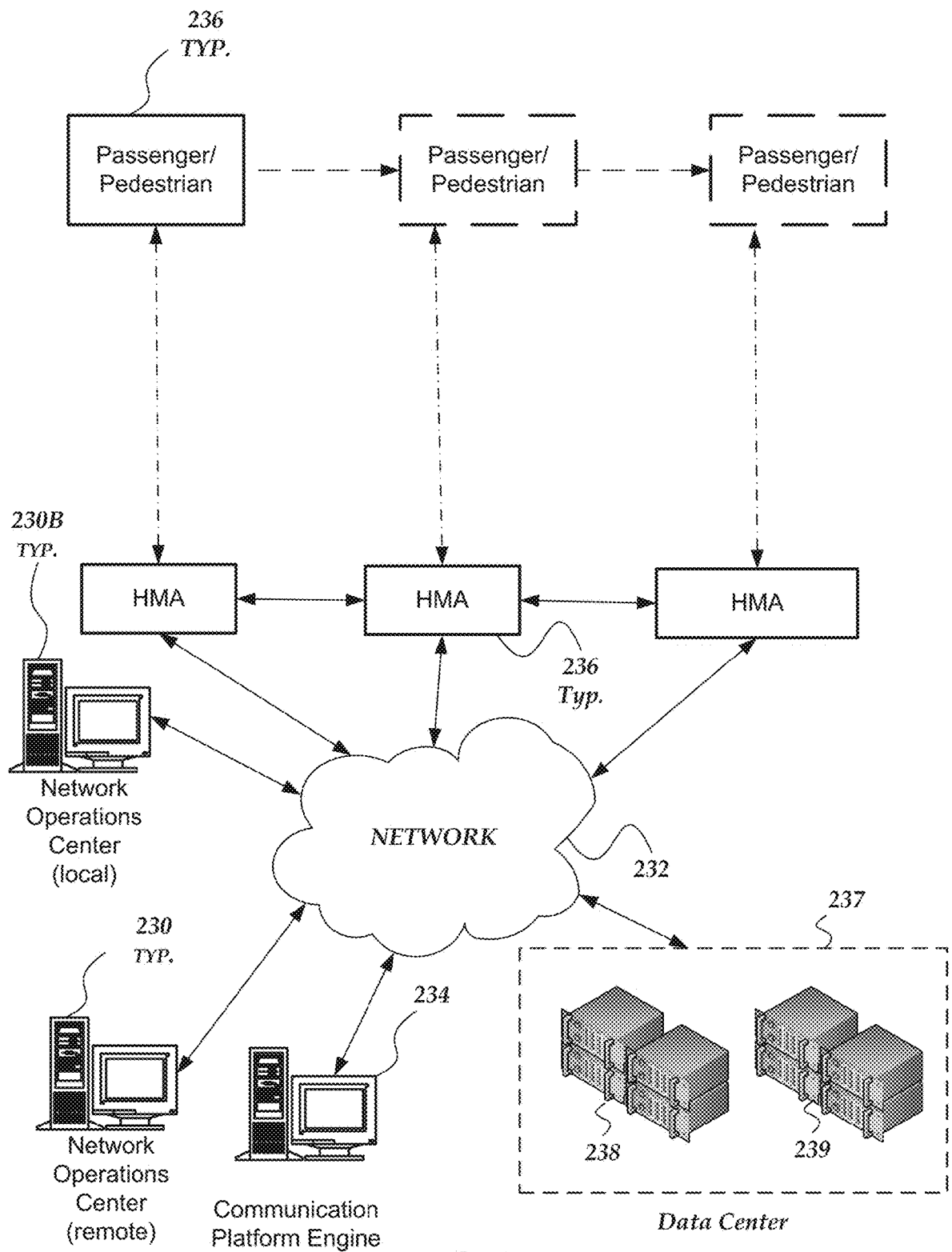
FIG. 2A shows a view of an embodiment of an exemplary environment, including an arrangement of a network operations centers, communication platform engines, HMAs, networks and users of wireless devices that may be pedestrians or passengers included in a vehicle at different locations on a path.

A wider beam pattern (also referred to as a "radiation pattern") is desirable in a number of applications, but the achievable width may be limited by, or otherwise not available using, a single HMA. Multiple instances of HMAs can be positioned in an array of HMAs to produce a wider composite far-field beam pattern. It will be recognized, however, that the individual beam patterns from the individual HMAs will often interact and change the composite far-field beam pattern so that, at least in some instances, without employing the one or more embodiments of the invention, the simple combination of the outputs of multiple instances of HMAs produces a composite far-field beam pattern that does not achieve the desired or intended configuration FIG. 2A illustrates an overview of system for communicating data from one or more data centers (not shown), which employ one or more remote and/or local network operations centers 230 to route the data to a plurality of HMAs that communicate the data in the form of wireless signals to one or more vehicles 236 traveling along a path. As shown, the data communicated from one or more data centers 237 is routed in part by one or more NOCs 230 over network 232 to one or more HMAs 234 that are selected to communicate the data in wireless signals at particular locations to one or more vehicles 236 traveling along a path.

In some embodiments, one or more data centers, such as, data center 237 may be communicatively coupled to network 232. In at least one of the various embodiments, data center 237 may be a portion of a private data center, public data center, public cloud environment, or private cloud environment. In some embodiments, data center 237 may be a server room/data center that is physically under the control of an organization. Data center 237 may include one or more enclosures of network computers, such as, enclosure 238 and enclosure 239.

Enclosure 238 and enclosure 239 may be enclosures (e.g., racks, cabinets, or the like) of network computers and/or blade servers in data center 237. In some embodiments, enclosure 238 and enclosure 239 may be arranged to include one or more network computers arranged to operate as network operations center servers, communication platform engine servers, storage computers, or the like, or combination thereof. Further, one or more cloud instances may be operative on one or more network computers included in enclosure 120 and enclosure 122.

Also, data center 237 may include one or more public or private cloud networks. Accordingly, data center 237 may comprise multiple physical network computers, interconnected by one or more networks, such as, networks similar to and/or including network 232. Data center 237 may enable and/or provide one or more cloud instances (not shown). The number and composition of cloud instances may be vary depending on the demands of individual users, cloud network arrangement, operational loads, performance considerations, application needs, operational policy, or the like. In at least one of the various embodiments, data center 237 may be arranged as a hybrid network that includes a combination of hardware resources, private cloud resources, public cloud resources, or the like.

Network 232 may be configured to couple network operation center computers with other computing devices, including communication platform engine computers. Network 232 may include various wired and/or wireless technologies for communicating with a remote device, such as, but not limited to, USB cable, Bluetooth®, Wi-Fi®, or the like. In some embodiments, network 232 may be a network configured to couple network computers with other computing devices. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or various combinations thereof. In various embodiments, network 232 may be enabled to employ various forms of communication technology, topology, computer-readable media, or the like, for communicating information from one electronic device to another. For example, network 232 can include—in addition to the Internet—LANs, WANs, Personal Area Networks (PANs), Campus Area Networks, Metropolitan Area Networks (MANs), direct communication connections (such as through a universal serial bus (USB) port), or the like, or various combinations thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ various ones of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, network 232 may include various communication technologies by which information may travel between computing devices.

Network 232 may, in some embodiments, include various wireless networks, which may be configured to couple various portable network devices, remote computers, wired networks, other wireless networks, or the like. Wireless networks may include various ones of a variety of sub-networks that may further overlay stand-alone ad-hoc networks, or the like, to provide an infrastructure-oriented connection for at least client computer. Such sub-networks may include mesh networks, Wireless LAN (WLAN) networks, cellular networks, or the like. In one or more of the various embodiments, the system may include more than one wireless network.

Network 232 may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra-wide band (UWB), Wireless Application Protocol (WAP), user datagram protocol (UDP), transmission control protocol/Internet protocol (TCP/IP), various portions of the Open Systems Interconnection (OSI) model protocols, session initiated protocol/real-time transport protocol (SIP/RTP), short message service (SMS), multimedia messaging service (MMS), or various ones of a variety of other communication protocols and/or technologies.

In various embodiments, at least a portion of network 232 may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self-organize based on current operating conditions and/or rule-based policies, such that the network topology of the network may be modified.

Figure 2B:
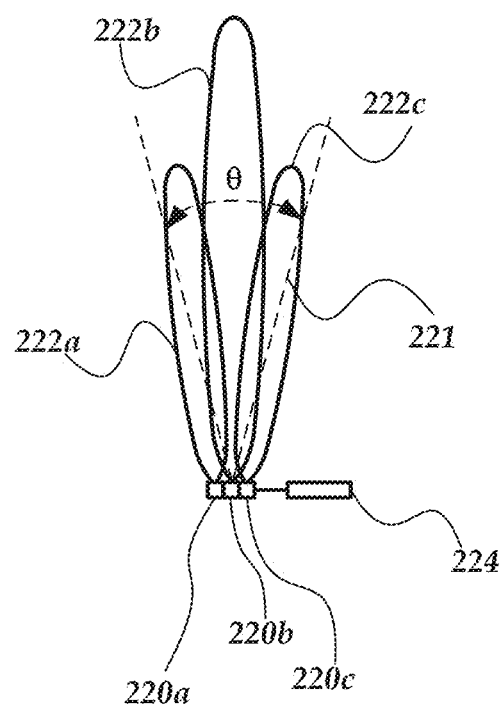
FIG. 2B shows a side view of another embodiment of an exemplary arrangement of multiple instances of HMAs.
Figure 2C:
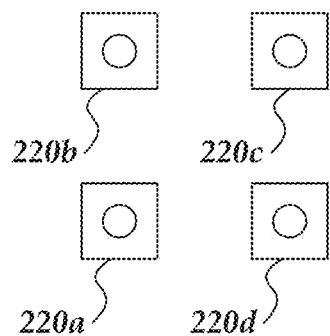
FIG. 2C shows a top view of yet another embodiment of an exemplary arrangement of multiple instances of HMAs.

FIG. 2B illustrates another arrangement of HMAs 220a, 220b, 220c that produce beams 222a, 222b, 222c where the middle beam 222b is substantially different in size and shape from the other two beams 222a, 222c. FIG. 2C illustrates, in a top view, yet another arrangement of HMAs 220a, 220b, 220c, 220d which form a two-dimensional array.

Also, one or more particular shapes of beam patterns, such as wide beam patterns, narrow beam patterns or composite beam patterns, may be desirable in a number of applications at different times for different conditions, but may not be practical or even available using a single HMA. In one or more embodiments, multiple instances of HMAs may be positioned in an array to produce a wide variety of composite, near-field, and/or far-field beam patterns without significant cancellation or signal loss. Since the object waves of multiple instances of HMAs may interfere with each other, adjustment to their object waves may be desirable to generate a beam pattern "closer" to the desired shape of a particular beam pattern. Any suitable methodology or metric can be used to determine the "closeness" of a beam pattern to a desired beam pattern including, but not limited to, an average deviation (or total deviation or sum of the magnitudes of deviation) over the entire beam pattern or a defined portion of the beam pattern from the desired beam pattern or the like.

In one of more embodiments, a physical arrangement of HMAs may be existing or can be constructed and coupled to a reference wave source. In one or more embodiments, a hologram function can be calculated, selected, or otherwise provided or determined for each of the HMAs. Each of the HMAs includes an array of dynamically adjustable scattering elements that have an adjustable electromagnetic response to a reference wave from the reference wave source. The hologram function for the HMA defines adjustments of the electromagnetic responses for the scattering elements of the HMA to produce an object wave that is emitted from the HMA in response to the reference wave. The object waves produced by the HMAs may be combined to produce a composite beam. Any suitable method or technique can be used to determine or provide any arrangement of HMAs to produce a composite beam, such as the exemplary composite beams illustrated in FIGS. 2B and 2C.

Figure 2D:
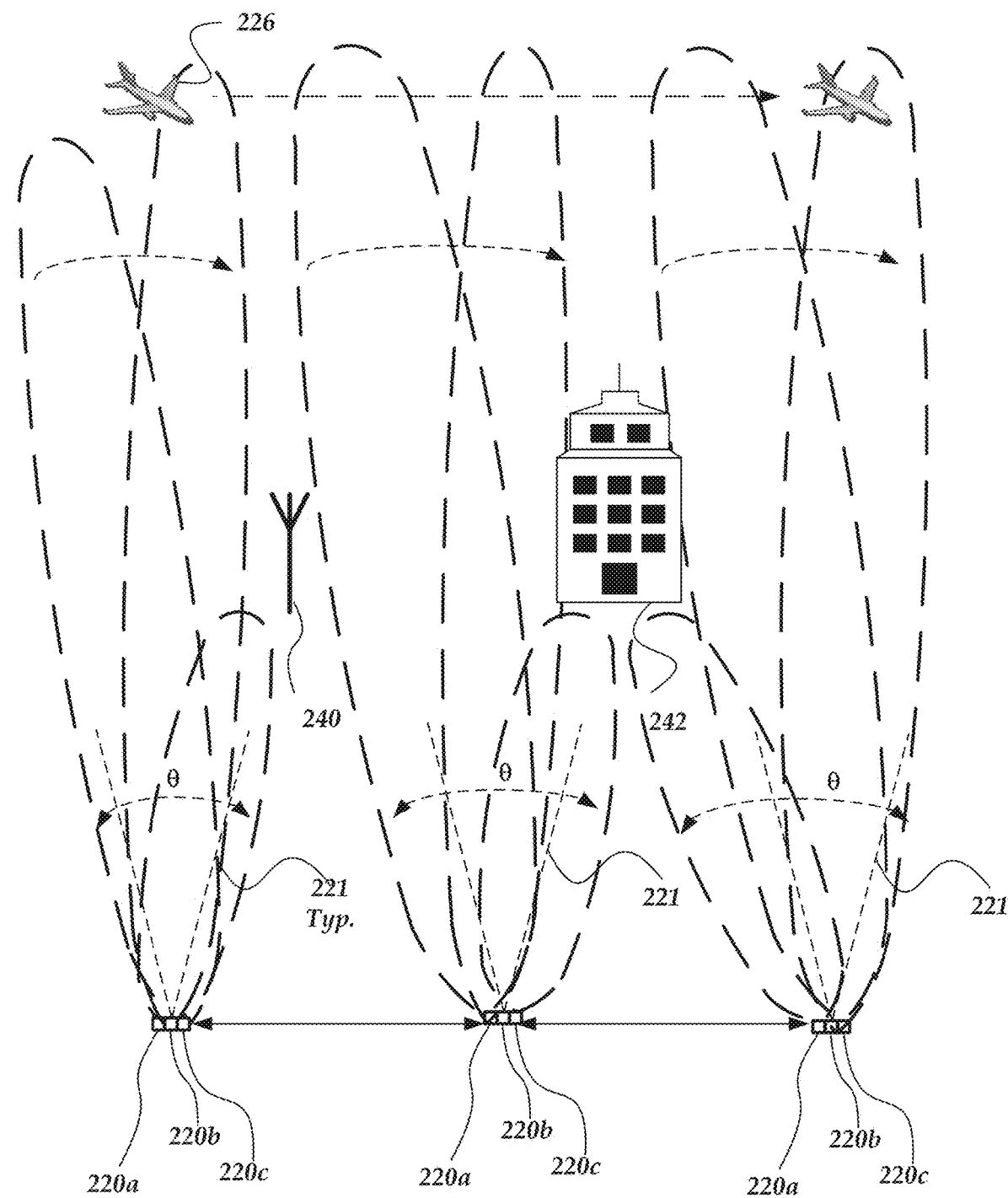
FIG. 2D illustrates a view of an aircraft traveling along a path with beams of wireless signals being arranged in real time along the path to improve wireless communication, for wireless devices employed by aircraft passengers, provided from several HMAs disposed at different locations along the path.

FIG. 2D illustrates an overview of a plurality of a plurality of three HMAs 220a, 220b, 220c, clustered at three different locations. As shown, an aircraft (vehicle) 226 is traveling along a path above the surface of the earth, and the HMAs at each location provide focused wireless signal waveforms 221 that improve the wireless communication with the aircraft and any wireless devices employed by its passengers. In one or more embodiments, the waveform can be focused to dynamically move across an angle (theta) to provide strong wireless signal communication with the aircraft as it travels along the path, e.g., analogous to a focused search light beam that lights up an aircraft in the sky.

Also, in one or more embodiments, a configuration of the wireless signal waveform can be configured to statically provide strong wireless signal communication across the angle as the aircraft is flying in the sky. Once the aircraft travels past an angle that a focused wireless signal waveform can be provided from a current location by one or more selected HMAs, one or more next HMAs at a new location are selected to provide the focused wireless signal waveform for improved wireless communication with the moving aircraft and the wireless devices of its passengers. Although the exemplary embodiment shows a focused wireless signal that provides strong wireless signal communication with a moving aircraft through an angle (theta), in one or more other embodiments, the focused wireless signal may move in real time through an angle to follow the aircraft traveling across the sky. Additionally, in one or more embodiments, a configuration of the wireless signal waveform may be adjusted to compensate for the presence of physical structures 240 such as buildings, trees (not shown), hills (not shown), or the like that may block or degrade the quality of wireless communication. Further, in one or more embodiments, a configuration of the wireless signal waveform may be adjusted to compensate for the presence of one or more other surface scattering antennas 240 that interfere with wireless communication.

Figure 2E:
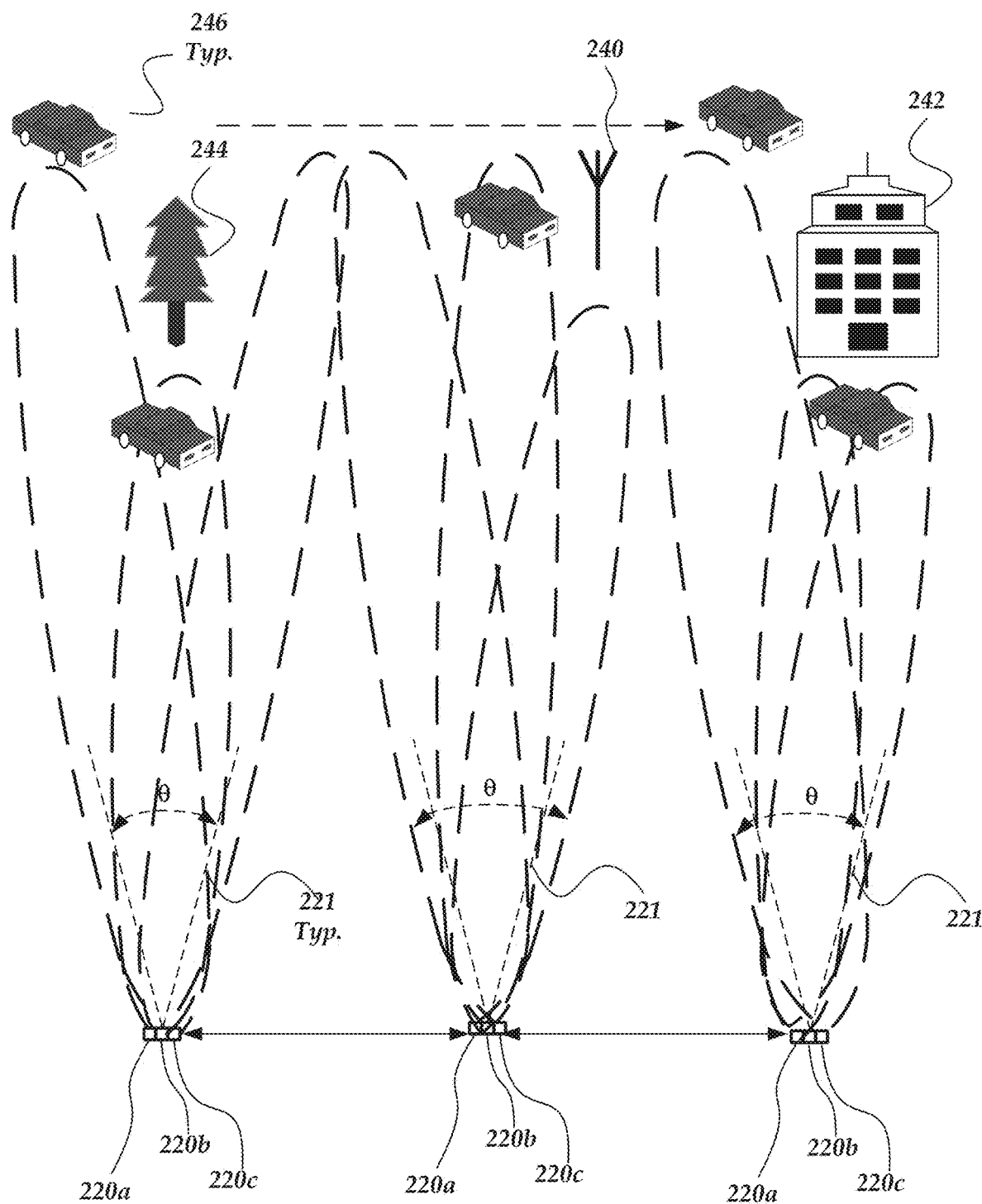
FIG. 2E shows a view of an automobile traveling along a path with beams of wireless signals being arranged in real time along the path to improve wireless communication, for wireless devices employed by automobile passengers, provided from several HMAs disposed at different locations along the path.

FIG. 2E illustrates an overview of a plurality of a plurality of three HMAs 220a, 220b, 220c, clustered at three different locations. As shown, an automobile (vehicle) 246 is traveling along a path on the surface of the earth, and the HMAs at each location provide focused wireless signal waveforms 221 that improve the wireless communication with the vehicle and any wireless devices employed by its passengers. In one or more embodiments, the waveform can be focused to dynamically move across an angle (theta) to provide strong wireless signal communication with the vehicle as it travels along the path, e.g., analogous to a focused search light beam that lights up an object on the earth's surface.

Also, in one or more embodiments, a configuration of the wireless signal waveform can be configured to statically provide strong wireless signal communication across the theta angle as the vehicle is traveling on a path. Once the vehicle travels past the angle that a focused wireless signal waveform can be provided from a current location by one or more selected HMAs, one or more next HMAs at a new location are selected to provide the focused wireless signal waveform for improved wireless communication with the moving vehicle and the wireless devices of its passengers. Although the exemplary embodiment shows a focused wireless signal that provides strong wireless signal communication with a moving vehicle through an angle (theta), in one or more other embodiments, the focused wireless signal may move in real time through an angle to follow the vehicle traveling a path on the earth's surface. Additionally, in one or more embodiments, a configuration of the wireless signal waveform may be adjusted to compensate for the presence of physical structures 244 such as buildings (not shown), trees, hills (not shown), or the like that may block or degrade the quality of wireless communication. Further, in one or more embodiments, a configuration of the wireless signal waveform may be adjusted to compensate for the presence of one or more other surface scattering antennas 240 that interfere with wireless communication.

Figure 2F:
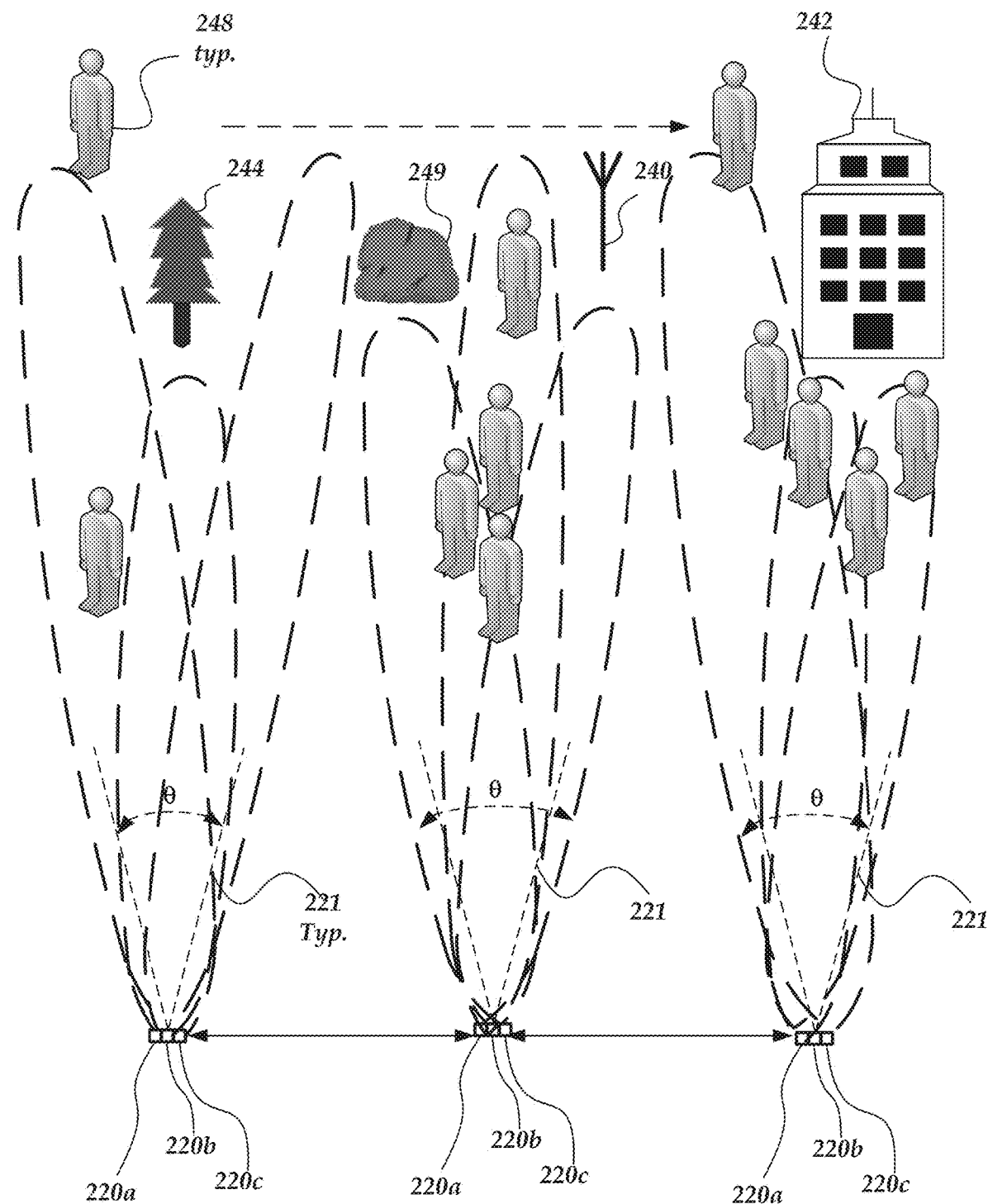
FIG. 2F illustrates a view of a pedestrians traveling along a path with beams of wireless signals being arranged in real time along the path to improve wireless communication, for wireless devices employed by the pedestrians, provided from several HMAs disposed at different locations along the path.

FIG. 2F illustrates an overview of a plurality of a plurality of three HMAs 220a, 220b, 220c, clustered at three different locations. As shown, one or more pedestrians 246 is traveling along a path on the surface of the earth, and the HMAs at each location provide focused wireless signal waveforms 221 that improve the wireless communication with any wireless devices employed by the pedestrians. In one or more embodiments, the waveform can be focused to dynamically move across an angle (theta) to provide strong wireless signal communication with the pedestrians as they travel along the path, e.g., analogous to a focused search light beam that lights up an object on the earth's surface.

Also, in one or more embodiments, a configuration of the wireless signal waveform can be configured to statically provide strong wireless signal communication across the theta angle as pedestrians using wireless devices are traveling on a path. Once the pedestrians travel past the theta angle that a focused wireless signal waveform can be provided from a current location by one or more selected HMAs, one or more next HMAs at a new location are selected to provide the focused wireless signal waveform for improved wireless communication with the moving wireless devices of the pedestrians. Although the exemplary embodiment shows a focused wireless signal that provides strong wireless signal communication with a moving pedestrian through an angle (theta), in one or more other embodiments, the focused wireless signal may move in real time through an angle to follow the pedestrians using wireless devices that are traveling a path on the earth's surface. Additionally, in one or more embodiments, a configuration of the wireless signal waveform may be adjusted to compensate for the presence of physical structures such as buildings 242, trees 244, hills 249, or the like that may block or degrade the quality of wireless communication with the wireless devices employed by the one or more pedestrians. Further, in one or more embodiments, a configuration of the wireless signal waveform may be adjusted to compensate for the presence of one or more other surface scattering antennas 240 that interfere with wireless communication.

Figure 2G:
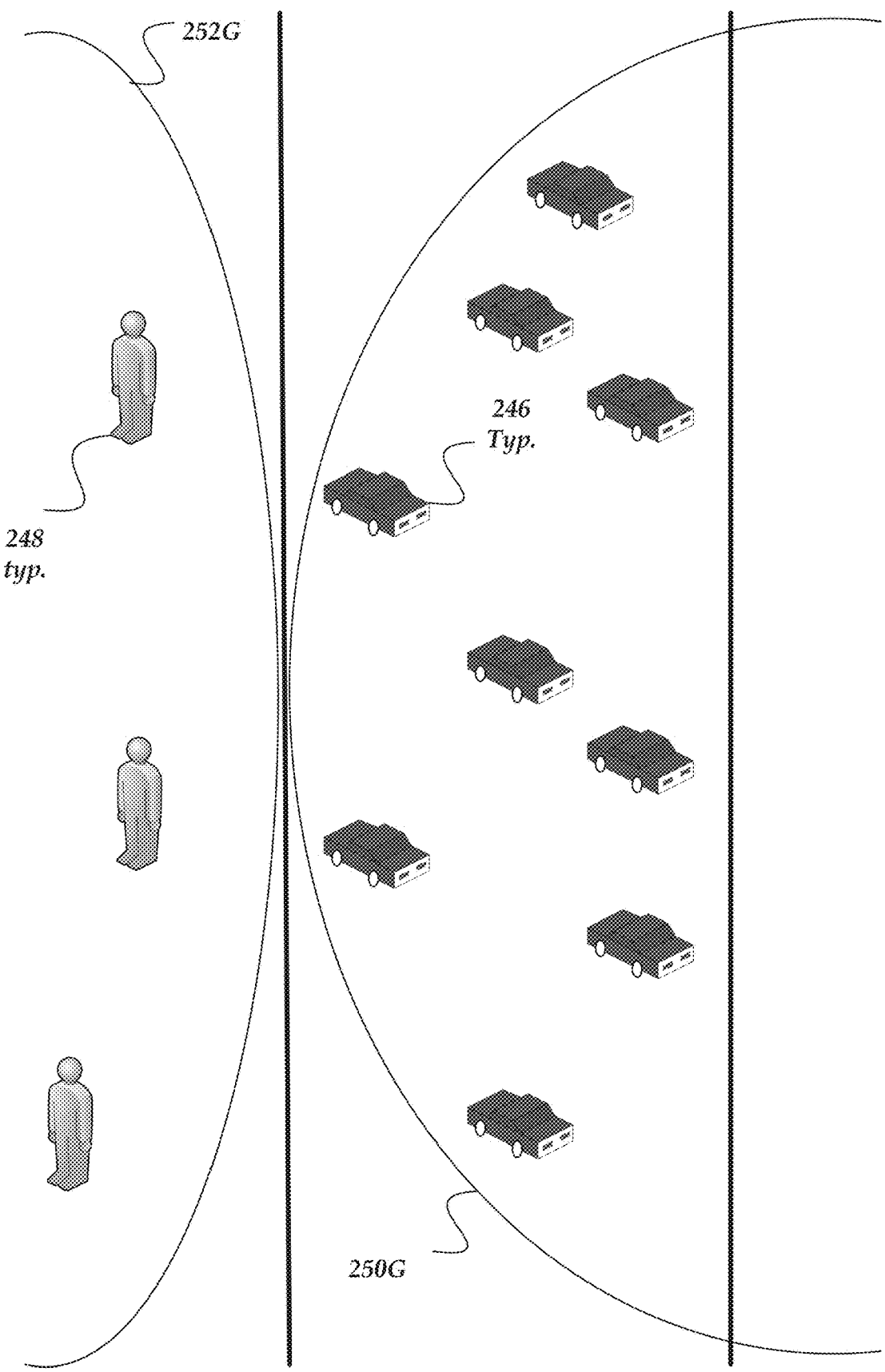
FIG. 2G shows a view of one beam of wireless signals providing wireless communication with a relatively low number of wireless devices employed by passengers in automobiles on a road and another beam of wireless signals providing wireless communication with a relatively low number of wireless devices employed by pedestrians located adjacent to the road.

FIG. 2G shows a top view of a relatively low number of motorized vehicles (automobiles 246) traveling along a road. Also, a relatively low number of users (pedestrians 248) are shown at a location, e.g., a park, that is adjacent to the road. One waveform beam of wireless signals 250G is shown providing wireless communication for wireless devices (not shown) employed by passengers of the vehicles on the road. Also, another waveform beam of wireless signals 252G is shown providing wireless communication with wireless devices employed by the pedestrians located adjacent to the road.

In this exemplary embodiment, the separate surface scattering antennas (not shown) are separately providing the two waveform beams for wireless communication to the road or adjacent to the road in such a way that the number of wireless devices (loads) provided with wireless communication are relatively balanced. Additionally, in one or more other embodiments, the load capabilities of two or more surface scattering antennas providing wireless communication to a particular geographic location may be dissimilar. In this case, the waveform beam for each surface scattering antenna may be modified to proportionally balance the load between the two or more surface scattering antennas according to a load capability of each surface scattering antenna to provide wireless communication with wireless devices.

Figure 2H:
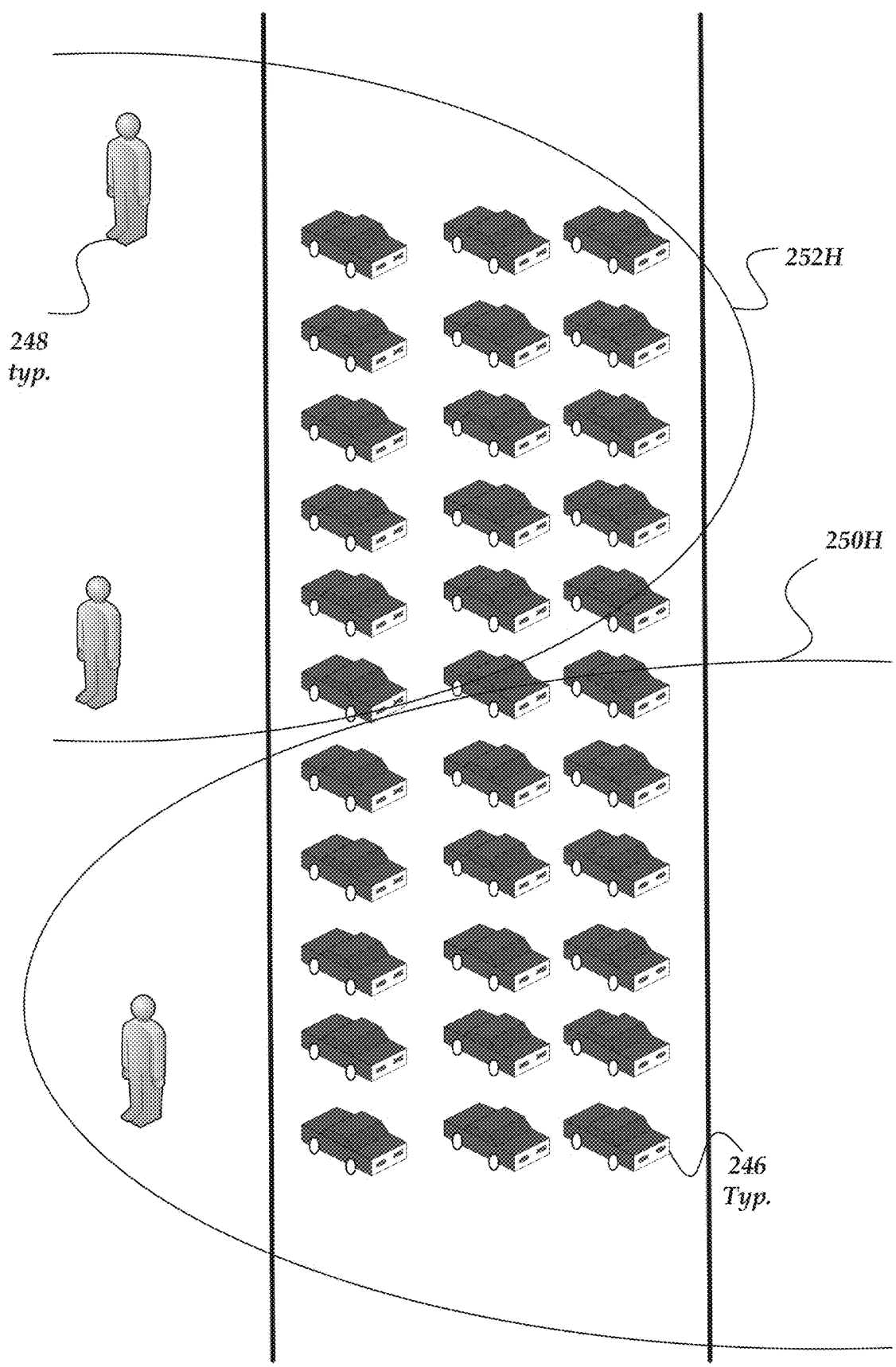
FIG. 2H illustrates a view of one beam of wireless signals providing wireless communication with a portion of a relatively large number of wireless devices employed by passengers of automobiles on a road and another beam of wireless signals providing wireless communication with another portion of the large number wireless devices employed by passengers of automobiles on the road.

FIG. 2H shows a top view of a relatively high number of motorized vehicles (automobiles 246) traveling along a road. Also, a relatively low number of users (pedestrians 248) are shown at a location, e.g., a park, or the like, that is adjacent to the road. Instead of continuing with the waveform beams shown in FIG. 2G, one waveform beam of wireless signals 250H is shown modified to provide wireless communication for a portion of the wireless devices (not shown) employed by passengers of the vehicles on the road and a portion of the wireless devices (not shown) employed by the pedestrians. Also, another waveform beam of wireless signals 252H is shown modified to provide wireless communication with wireless devices employed by another portion of passengers in the vehicles on the road and another portion of the wireless devices employed by the pedestrians. In this exemplary embodiment, the separate surface scattering antennas (not shown) have modified their separate waveform beams to relatively evenly balance a number of wireless devices (load) that are provided wireless communication by each of the separate surface scattering antennas.

Additionally, in one or more other embodiments, the load capabilities of the two or more surface scattering antennas providing wireless communication to wireless devices at relatively the same location may be dissimilar. Although not shown, in this case, a separate waveform for each surface scattering antenna may be modified to proportionally balance the number of wireless devices (load) that are provided wireless communication between the two or more surface scattering antennas according to a load capability of a particular surface scattering antenna to provide wireless communication with wireless devices. Also, the amount of data wirelessly communicated by each of the wireless devices may also be considered in determining the balancing of the loads by modifying the waveform beams for two or more surface scattering antennas providing wireless communication with wireless devices employed by users (pedestrians or passengers). For example, some of the wireless devices may be streaming video constantly, and other wireless devices may only occasionally communicate a text message.

Figure 2I:
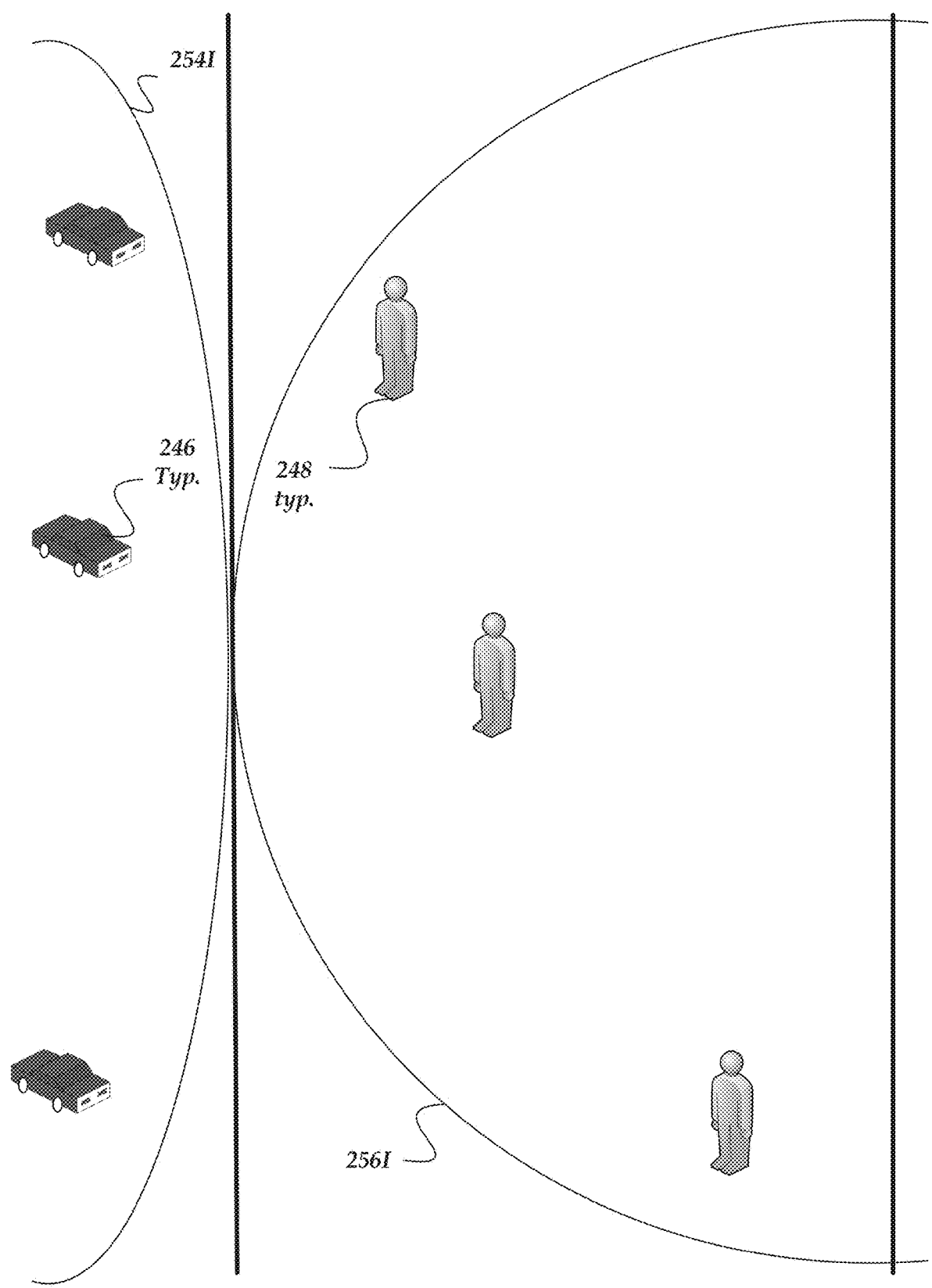
FIG. 2I shows a view of one beam of wireless signals providing wireless communication with a relatively low number of wireless devices employed by pedestrians in a park and another beam of wireless signals providing wireless communication with a relatively low number of wireless devices employed by passengers of automobiles located adjacent to the park.

FIG. 2I is somewhat similar to FIG. 2G except that it shows a top view of a relatively low number of wireless device users (pedestrians 248) at a location, e.g., a park, that is adjacent to a road. One waveform beam of wireless signals 256I is shown providing wireless communication for wireless devices (not shown) employed by the pedestrians. Also, another waveform beam of wireless signals 254I is shown providing wireless communication with wireless devices employed by the passengers of vehicles traveling on the road. In this exemplary embodiment, the separate surface scattering antennas (not shown) are separately providing the two waveform beams for wireless communication to the road or the park in such a way that their loads are relatively balanced.

Figure 2J:
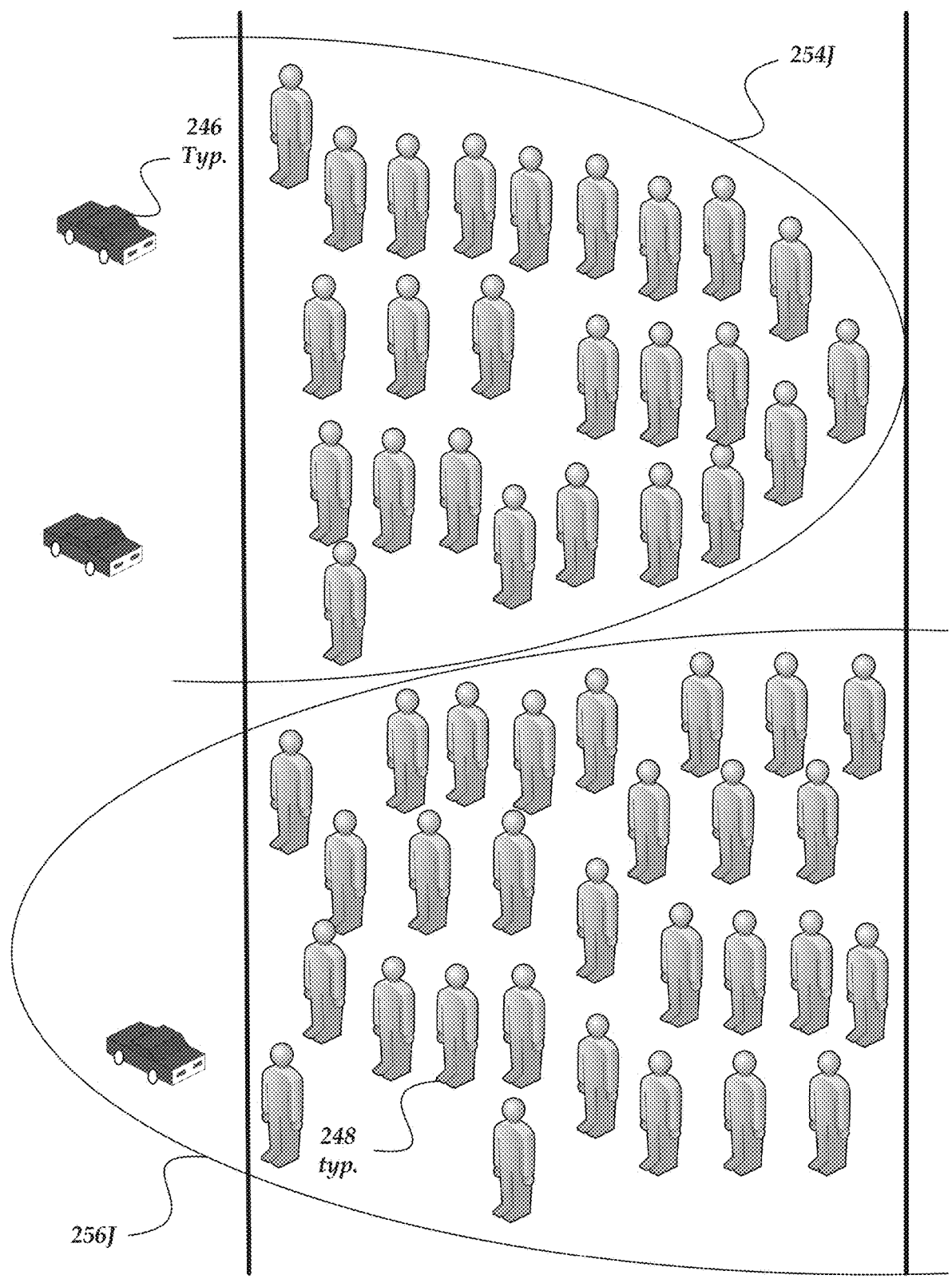
FIG. 2J illustrates a view of one beam of wireless signals providing wireless communication with a portion of a relatively large number of wireless devices employed by pedestrians in a park and another beam of wireless signals providing wireless communication with another portion of the large number of wireless devices employed by pedestrians in the park.

FIG. 2J is somewhat similar to FIG. 2H except that it shows a top view of a relatively high number of wireless device users (pedestrians 248) at a location, e.g., a park, that is adjacent to a road. Also, a relatively low number of vehicles (automobiles 246) are shown at a on the road. Instead of continuing with the waveform beams shown in FIG. 2I, one waveform beam of wireless signals 254J is shown modified to provide wireless communication for a portion of the wireless devices (not shown) employed by passengers of the vehicles on the road and a portion of the wireless devices (not shown) employed by the pedestrians. Also, another waveform beam of wireless signals 256J is shown modified to provide wireless communication with wireless devices employed by another portion of passengers in the vehicles on the road and another portion of the wireless devices employed by the pedestrians. In this exemplary embodiment, the separate surface scattering antennas (not shown), such as HMAs, have modified their separate waveform beams to relatively evenly balance a number of wireless devices (load) that are provided wireless communication by each of the separate surface scattering antennas.

Additionally, in one or more other embodiments, the load capabilities of the two or more surface scattering antennas providing wireless communication to wireless devices at relatively the same location may be dissimilar. Although not shown, in this case, a separate waveform for each surface scattering antenna may be modified to proportionally balance the number of wireless devices (load) that are provided wireless communication between the two or more surface scattering antennas according to a load capability of a particular surface scattering antenna to provide wireless communication with wireless devices. Also, the amount of data wirelessly communicated by each of the wireless devices may also be considered in determining the balancing of the loads by modifying the waveform beams for two or more surface scattering antennas providing wireless communication with wireless devices employed by users (pedestrians or passengers). For example, some of the wireless devices may be streaming video constantly, and other wireless devices may only occasionally communicate a text message.

Illustrative Network Computer

Figure 3:
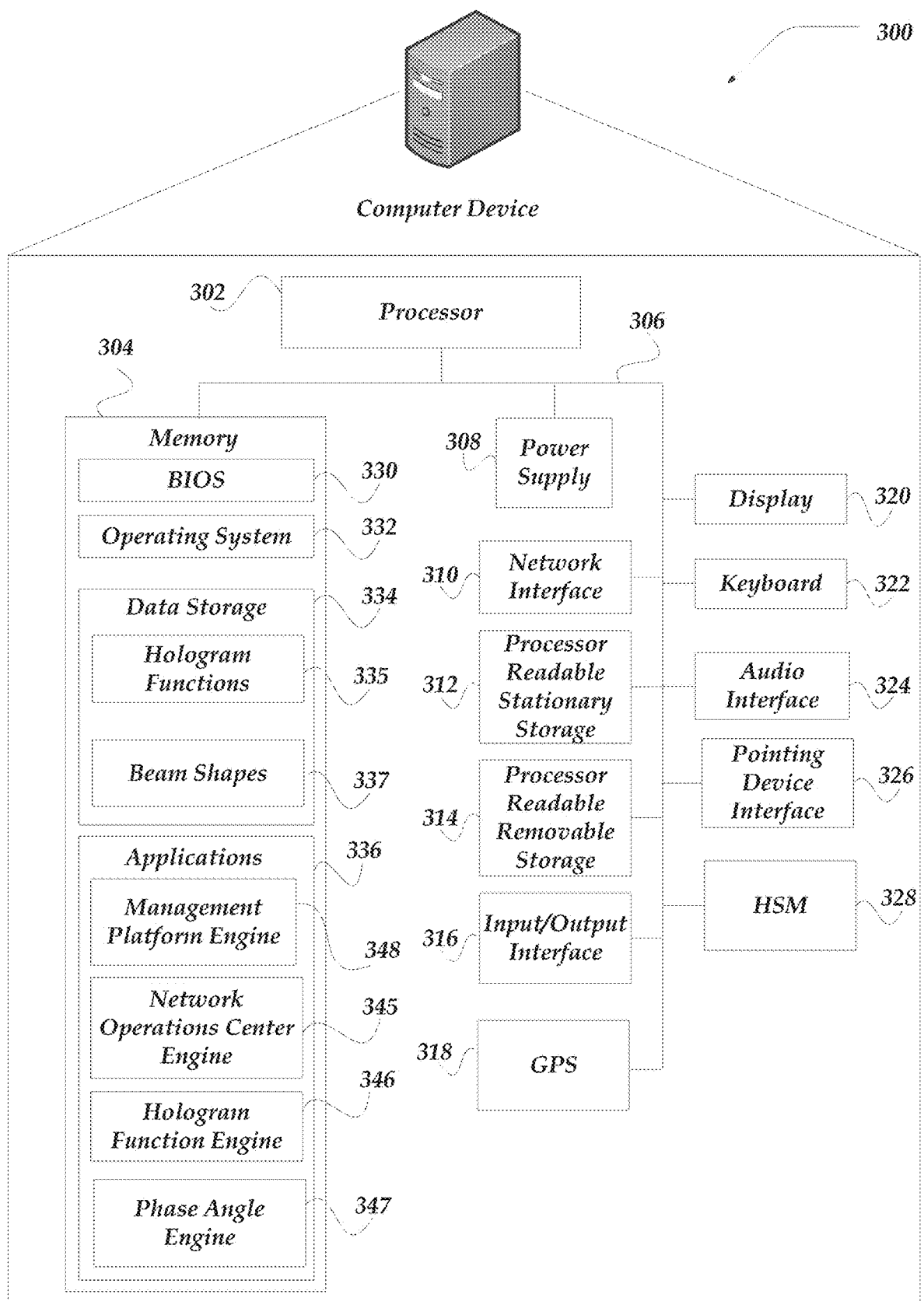
FIG. 3 shows an embodiment of an exemplary computer device that may be included in a system such as that shown in FIG. 2A.

FIG. 3 shows one embodiment of an exemplary computer device 300 that may be included in an exemplary system implementing one or more of the various embodiments. Computer device 300 may include many more or less components than those shown in FIG. 3. However, the components shown are sufficient to disclose an illustrative embodiment for practicing these innovations. Computer device 300 may include a desktop computer, a laptop computer, a server computer, a client computer, and the like. Computer device 300 may represent, for example, one embodiment of one or more of a laptop computer, smartphone/tablet, computer device, controller of one or more HMAs, mobile device or may be part of the network operations center.

As shown in FIG. 3, computer device 300 includes one or more processors 302 that may be in communication with one or more memories 304 via a bus 306. In some embodiments, one or more processors 302 may be comprised of one or more hardware processors, one or more processor cores, or one or more virtual processors. In some cases, one or more of the one or more processors may be specialized processors or electronic circuits particularly designed to perform one or more specialized actions, such as, those described herein. Computer device 300 also includes a power supply 308, network interface 310, non-transitory processor-readable stationary storage device 312 for storing data and instructions, non-transitory processor-readable removable storage device 314 for storing data and instructions, input/output interface 316, GPS transceiver 318, display 320, keyboard 322, audio interface 324, pointing device interface 326, HSM 328, although a computer device 300 may include fewer or more components than those illustrated in FIG. 3 and described herein. Power supply 308 provides power to computer device 300.

Network interface 310 includes circuitry for coupling computer device 300 to one or more wired and/or wireless networks, and is constructed for use with one or more communication protocols and technologies including, but not limited to, protocols and technologies that implement various portions of the Open Systems Interconnection model (OSI model), global system for mobile communication (GSM), code division multiple access (CDMA), time division multiple access (TDMA), Long Term Evolution (LTE), 5G, 4G, 3G, 2G, user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or various ones of a variety of other wired and wireless communication protocols. Network interface 310 is sometimes known as a transceiver, transceiving device, or network interface card (MC). Computer device 300 may optionally communicate with a remote base station (not shown), or directly with another computer.

Audio interface 324 is arranged to produce and receive audio signals such as the sound of a human voice. For example, audio interface 324 may be coupled to a speaker and microphone (not shown) to enable telecommunication with others and/or generate an audio acknowledgement for some action. A microphone in audio interface 324 can also be used for input to or control of computer device 300, for example, using voice recognition.

Display 320 may be a liquid crystal display (LCD), gas plasma, electronic ink, light emitting diode (LED), Organic LED (OLED) or various other types of light reflective or light transmissive display that can be used with a computer. Display 320 may be a handheld projector or pico projector capable of projecting an image on a wall or other object.

Computer device 300 may also comprise input/output interface 316 for communicating with external devices or computers not shown in FIG. 3. Input/output interface 316 can utilize one or more wired or wireless communication technologies, such as USB™, Firewire™, Wi-Fi™, WiMax, Thunderbolt™, Infrared, Bluetooth™, Zigbee™, serial port, parallel port, and the like.

Also, input/output interface 316 may also include one or more sensors for determining geolocation information (e.g., GPS transceiver device 318), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to computer device 300. Human interface components can be physically separate from computer device 300, allowing for remote input and/or output to computer device 300. For example, information routed as described here through human interface components such as display 320 or keyboard 322 can instead be routed through the network interface 310 to appropriate human interface components located elsewhere on the network. Human interface components include various components that allow the computer to take input from, or send output to, a human user of a computer. Accordingly, pointing devices such as mice, styluses, track balls, or the like, may communicate through pointing device interface 326 to receive user input.

GPS transceiver 318 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 318 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, communication platform engine 348, or the like, may be arranged to employ geo-location information to select one or more localization (modification) features, such as, time zones, languages, holidays, cultural considerations, religious considerations, currencies, currency formatting, calendar formatting, or the like for an individual user. These modification features may be used in documents, clauses, clause meta-data, file systems, user-interfaces, reports, textual evaluators, semantic evaluators, as well as internal processes or databases. In at least one of the various embodiments, geo-location information used for selecting localization information may be provided by GPS 318. Also, in some embodiments, geolocation information may include information provided using one or more geolocation protocols over the networks, such as, wireless network 108 or network 111.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 330 for controlling low-level operation of computer device 300. The memory also stores an operating system 332 for controlling the operation of computer device 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 334, which can be utilized by computer device 300 to store, among other things, applications 336 and/or other data. For example, data storage 334 may also be employed to store information that describes various capabilities of computer device 300. In one or more of the various embodiments, data storage 334 may store hologram function information 335 or beam shape information 337. The hologram function information 335 or beam shape information 337 may then be provided to another device or computer based on various ones of a variety of methods, including being sent as part of a header during a communication, sent upon request, or the like. Data storage 334 may also be employed to store social networking information including address books, buddy lists, aliases, user profile information, or the like. Data storage 334 may further include program code, data, algorithms, and the like, for use by one or more processors, such as processor 302 to execute and perform actions such as those actions described below. In one embodiment, at least some of data storage 334 might also be stored on another component of computer device 300, including, but not limited to, non-transitory media inside non-transitory processor-readable stationary storage device 312, processor-readable removable storage device 314, or various other computer-readable storage devices within computer device 300, or even external to computer device 300.

Applications 336 may include computer executable instructions which, if executed by computer device 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 336 may include hologram function engine 346, phase angle engine 347, and/or communication platform engine 348, that perform actions further described below. In one or more of the various embodiments, one or more of the applications may be implemented as modules and/or components of another application. Further, in one or more of the various embodiments, applications may be implemented as operating system extensions, modules, plugins, or the like.

Furthermore, in one or more of the various embodiments, specialized applications such as hologram function engine 346, phase angle engine 347, and/or communication platform engine 348 may be operative in a networked computing environment to perform specialized actions described herein. In one or more of the various embodiments, these applications, and others, may be executing within virtual machines and/or virtual servers that may be managed in a networked environment such as a local network, wide area network, or cloud-based based computing environment. In one or more of the various embodiments, in this context the applications may flow from one physical computer device within the cloud-based environment to another depending on performance and scaling considerations automatically managed by the cloud computing environment. Likewise, in one or more of the various embodiments, virtual machines and/or virtual servers dedicated to the hologram function engine 346, phase angle engine 347, and/or communication platform engine 348, may be provisioned and de-commissioned automatically.

Also, in one or more of the various embodiments, the hologram function engine 346, phase angle engine 347, communication platform engine 348, or the like may be located in virtual servers running in a networked computing environment rather than being tied to one or more specific physical computer devices.

Further, computer device 300 may comprise HSM 328 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 328 may be a stand-alone computer device, in other cases, HSM 328 may be arranged as a hardware card that may be installed in a computer device.

Additionally, in one or more embodiments (not shown in the figures), the computer device may include one or more embedded logic hardware devices instead of one or more CPUs, such as, an Application Specific Integrated Circuits (ASICs), Field Programmable Gate Arrays (FPGAs), Programmable Array Logics (PALs), or the like, or combination thereof. The embedded logic hardware devices may directly execute embedded logic to perform actions. Also, in one or more embodiments (not shown in the figures), the computer device may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

Generalized Operations

Figure 4A:
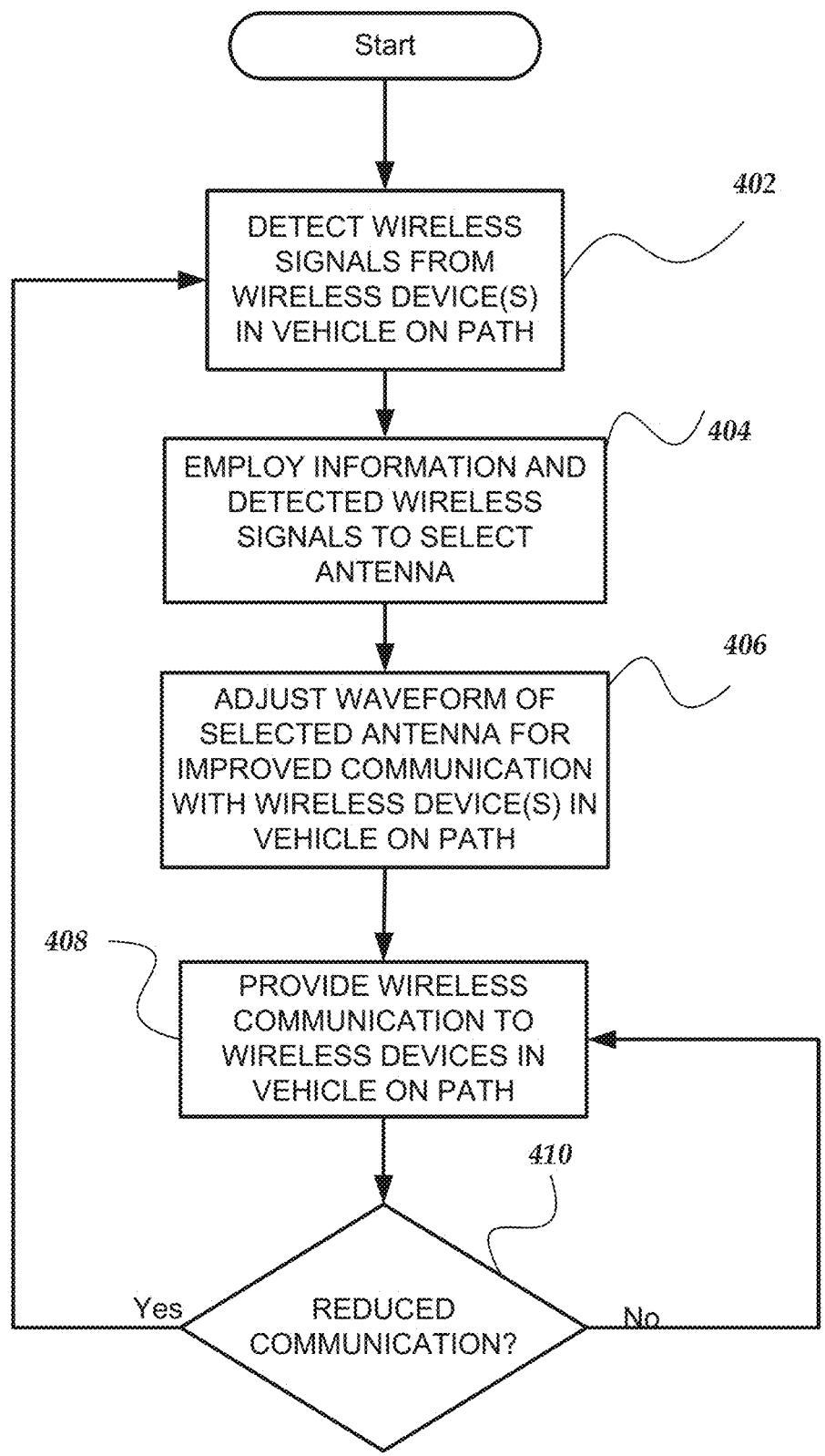
FIG. 4A illustrates a flow diagram for a process for detecting wireless signals from wireless devices employed by passengers in a vehicle and employing surface scattering antennas to provide improved wireless communication with these wireless devices in the vehicle.

In FIG. 4A, a method is shown for employing the invention to communicate wireless signals between a remotely located surface scattering antennas and a moving vehicle to provide wireless communication between remotely located computing resources, such as data centers and Network Operations Centers, and wireless devices controlled by the vehicle's passengers and the vehicle itself. Moving from a start block to block 402, the process employs one or more of a plurality of surface scattering antennas to detect wireless signals provided by a moving vehicle (or wireless devices employed by the vehicle's passengers) that may be traveling along a path that can be a known or an unknown path.

At block 404, the detected wireless signals and other information is employed to select one of the plurality of surface scattering antennas to wirelessly communicate with the vehicle and/or it's passengers wireless devices at a current location on the path. The other information can include one or more of heuristics based on other vehicles that included wireless device and have previously traveled the one or more paths, surface scattering antenna characteristics, velocity, weather, events, distance, events, load balancing information, topology of the plurality of surface scattering antennas, flight plan, shipping lanes, GPS information, in flight information, highway maps, depth charts, train track maps, detected interference with wireless signals previously communicated by the selected surface scattering antenna, weather, maintenance events, machine learning models, or any other third party information.

Moving to block 406, a determined waveform is provided to the selected surface scattering antenna to improve wireless communication between the selected surface scattering antenna and the wireless devices employed by passengers in the moving vehicle. Locally, the selected surface scattering antenna employs the determined waveform to arrange one or more of a shape, phase, or a direction of wireless signals communicated by the selected surface scattering antenna to the wireless devices employed by the passengers of the vehicle, which may or may not be moving. In one or more embodiments, the determination of each new waveform may be performed by one or more surface scattering antenna, or in combination with remote resources such as a cloud computing system, an edge computing resource, a remote server computer, or the like over a network.

At block 408, the selected surface scattering antenna employs the determined waveform to wireless communicate with the moving vehicle and/or its passengers' wireless devices. Next, at decision block 410, a determination is made whether the wireless signals detected by the selected surface scattering antenna has diminished below a threshold. If true, the process returns to block 402 to select a new surface scattering antenna to communicate wireless signals with the passengers' wireless devices in the moving vehicle at a new current location, and perform substantially the same actions again. However, if the determination at decision block 410 is false, then the process loops back to block 408 to perform substantially the same actions again.

Figure 4B:
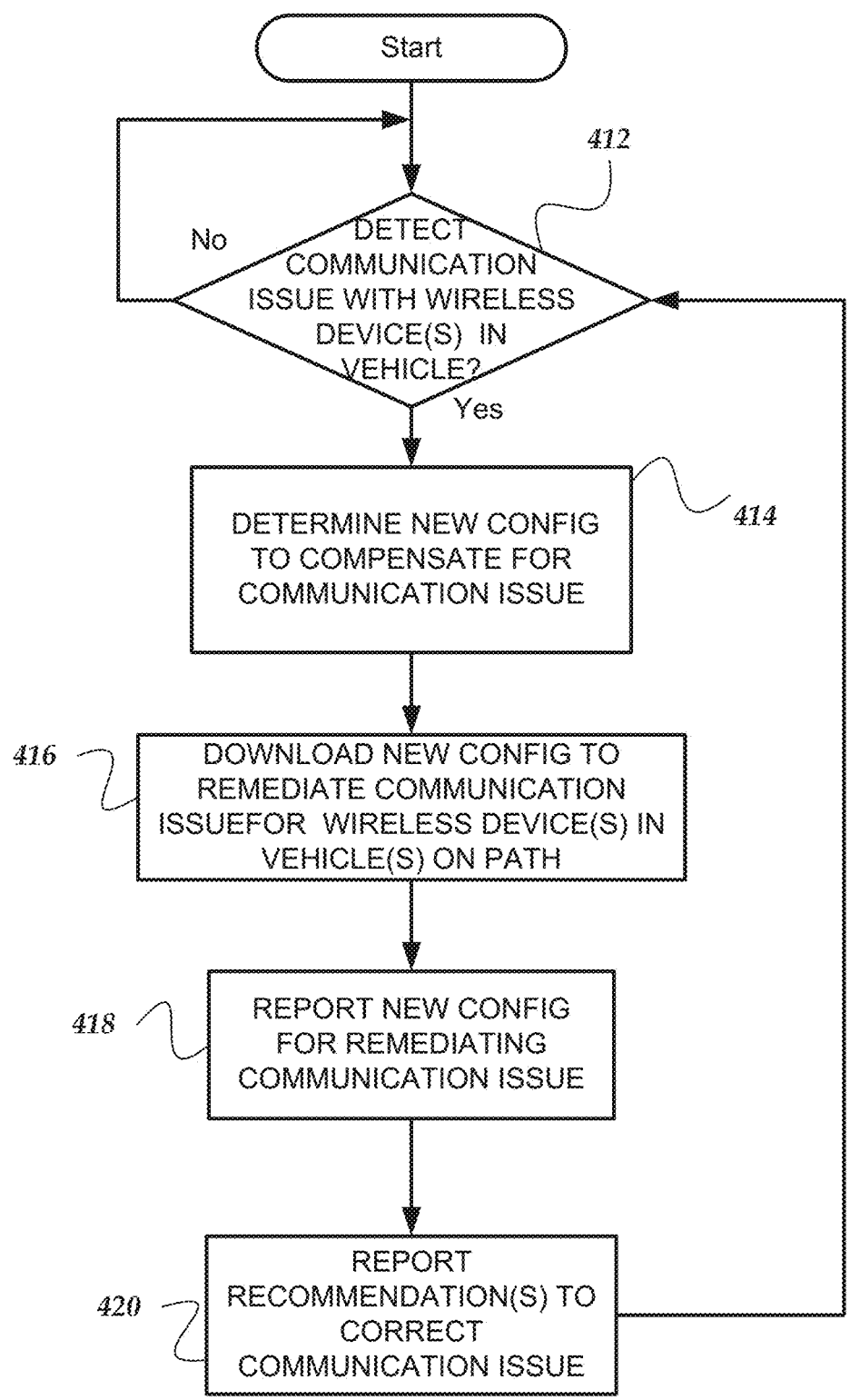
FIG. 4B illustrates a flow diagram for a process for detecting an issue in wireless communication with wireless devices employed by the passengers in a vehicle, and determining a remediation for surface scattering antennas employed to provide wireless communication with these wireless devices in the vehicle.

FIG. 4B illustrates a flow chart for a process for detecting an issue in providing wireless communication by one or more of the plurality of surface scattering antennas, and remotely determining a remediation that at least diminishes the issue in providing wireless communication to wireless devices employed by passengers, vehicles, and the like. Moving from a start block, the process advances to decision block 412 to determine if diminished wireless communication is an issue for one or more of the plurality of surface scattering antennas that could be selected for wireless communication with wireless devices.

If the determination at decision block 412 is true, then the process advances to block 414 where different types of information are remotely employed to determine one or more new configurations for one or more of the plurality of surface scattering antennas to compensate for the wireless communication issue. The different types of information can include correlations, causations, and other relevant data for the wireless communication issue, such as anomalies in surface scattering antenna performance, holidays, current events, load balancing information, topology of the plurality of surface scattering antennas, flight plans, highway maps, train track maps, previously detected wireless communication interference for one or more surface scattering antennas, weather events, maintenance events, damage to one or more of the surface scattering antennas, or any other third party information. The new configuration may include new determined waveforms for selected surface scattering antennas, preventing one or more of the surface scattering antennas from being selected to provide wireless communication with wireless devices employed by passengers of the moving vehicle, wireless devices employed by the vehicle itself, or the like.

At block 416, the new configuration is downloaded to at least a portion of the plurality of surface scattering antennas to provide remediation for the issue in providing wireless communication between a selected surface scattering antenna and a vehicle. Next, at block 418, a report is provided to a user, such as a system administrator, that an issue has been detected and a new configuration for one or more of the surface scattering antennas was downloaded and installed.

At block 420, an evaluation is made to create recommendations to correct the issue so that the new configuration is no longer needed. For example, if the issue is determined to be a power outage, a structure (building, tree) is blocking the full operation of a particular surface scattering antenna, or a bird has defecated on a surface of a surface scattering antenna, or the like, then a recommendation to send out a maintenance technician to correct this type of issue is provided to a system administrator. Next, the process looks back to decision block 412 where substantially the same actions are performed again.

Additionally, in one or more embodiments, the determination of new configuration may be performed locally by one or more surface scattering antennas, or in combination with remote resources such as a cloud computing system, an edge computing resource, a remote server computer, or the like over a network.

Figure 5A:
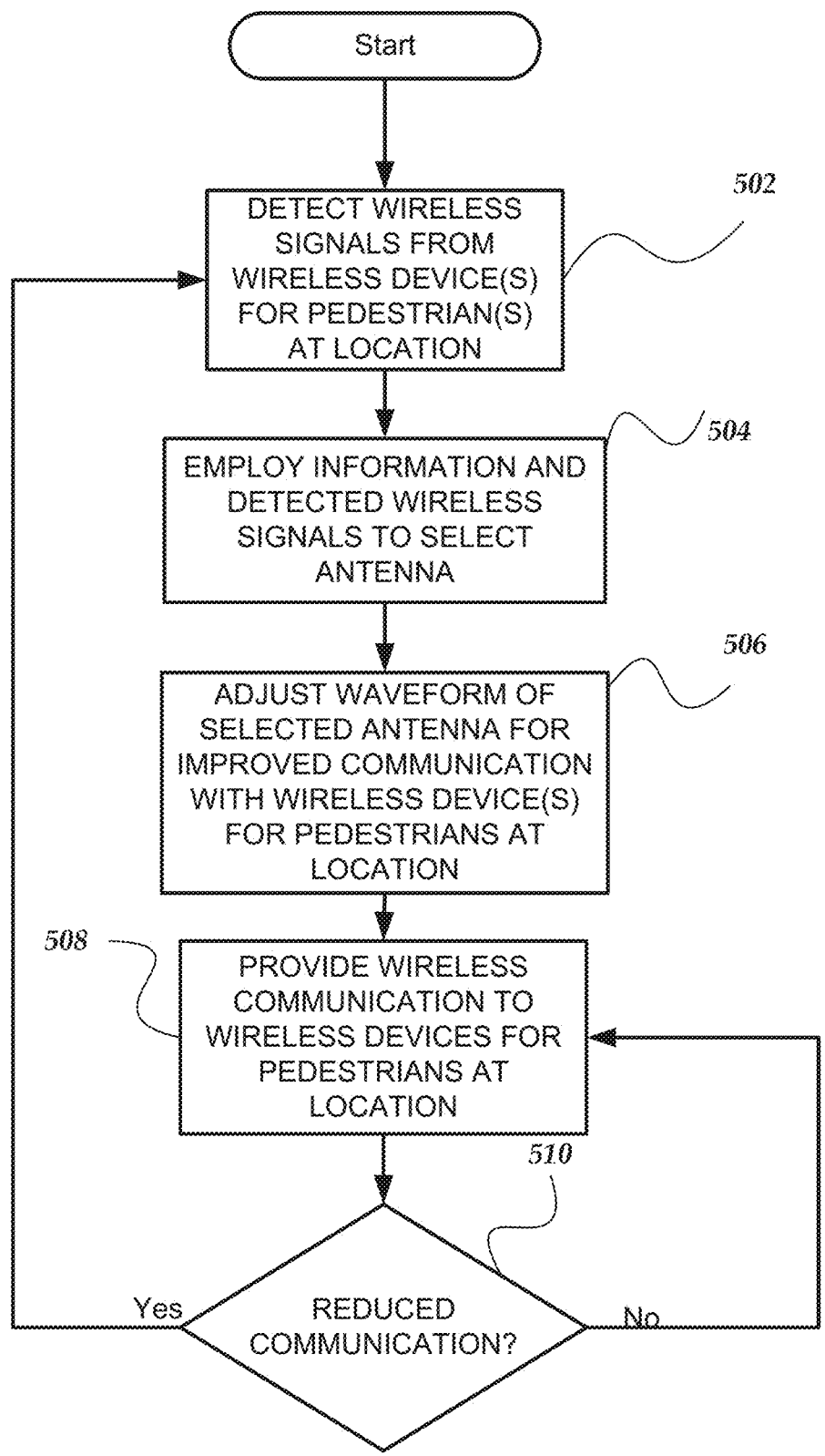
FIG. 5A illustrates a flow diagram for a process for detecting wireless signals from wireless devices employed by pedestrians at a location and employing surface scattering antennas to provide improved wireless communication with these wireless devices at the location.

In FIG. 5A, a method is shown for employing the invention to communicate wireless signals between remotely located surface scattering antennas and one or more wireless devices employed by one or more pedestrians at a location so that wireless communication can be provided to the wireless devices with remotely located computing resources, such as data centers and Network Operations Centers, and other wireless devices. Moving from a start block to block 502, the process employs one or more of a plurality of surface scattering antennas to detect wireless signals provided by one or more wireless devices employed by the one or more pedestrians at the location.

At block 504, the detected wireless signals and other information is employed to select one of the plurality of surface scattering antennas to wirelessly communicate with the one or more wireless devices employed by the one or more pedestrians at a current location that may be a known or unknown location. The other information can include one or more of heuristics based on one or more other wireless devices that were employed by one or more other pedestrians that were previously positioned at that location, surface scattering antenna characteristics, velocity, weather, events, distance, events, load balancing information, topology of the plurality of surface scattering antennas, flight plan, shipping lanes, depth charts, GPS information, in flight information, highway maps, train track maps, detected interference with wireless signals previously communicated by the selected surface scattering antenna, weather, maintenance events, machine learning models, or any other third party information.

Moving to block 506, a determined waveform is provided to the selected surface scattering antenna to improve wireless communication between the selected surface scattering antenna and the one or more wireless devices employed by the one or more pedestrians at the location. Locally, the selected surface scattering antenna employs the determined waveform to arrange one or more of a shape, phase, or a direction of wireless signals communicated by the selected surface scattering antenna with the wireless devices employed by the pedestrians. In one or more embodiments, the determination of each waveform may be performed by the selected surface scattering antenna, or in combination with a cloud computing system, a remote server computer, edge computing resource, or the like over a network.

At block 508, the selected surface scattering antenna employs the determined waveform to wirelessly communicate with the one or more wireless devices employed by the one or more pedestrians. Next, at decision block 510, a determination is made whether the wireless signals detected by the selected surface scattering antenna has diminished below a threshold at the location. If true, the process returns to block 502 to select a new surface scattering antenna to communicate wireless signals with the one or more wireless devices employed by the one or more pedestrians hat may have moved to a new current location, and perform substantially the same actions again. However, if the determination at decision block 510 is false, then the process loops back to block 508 to perform substantially the same actions again.

Figure 5B:
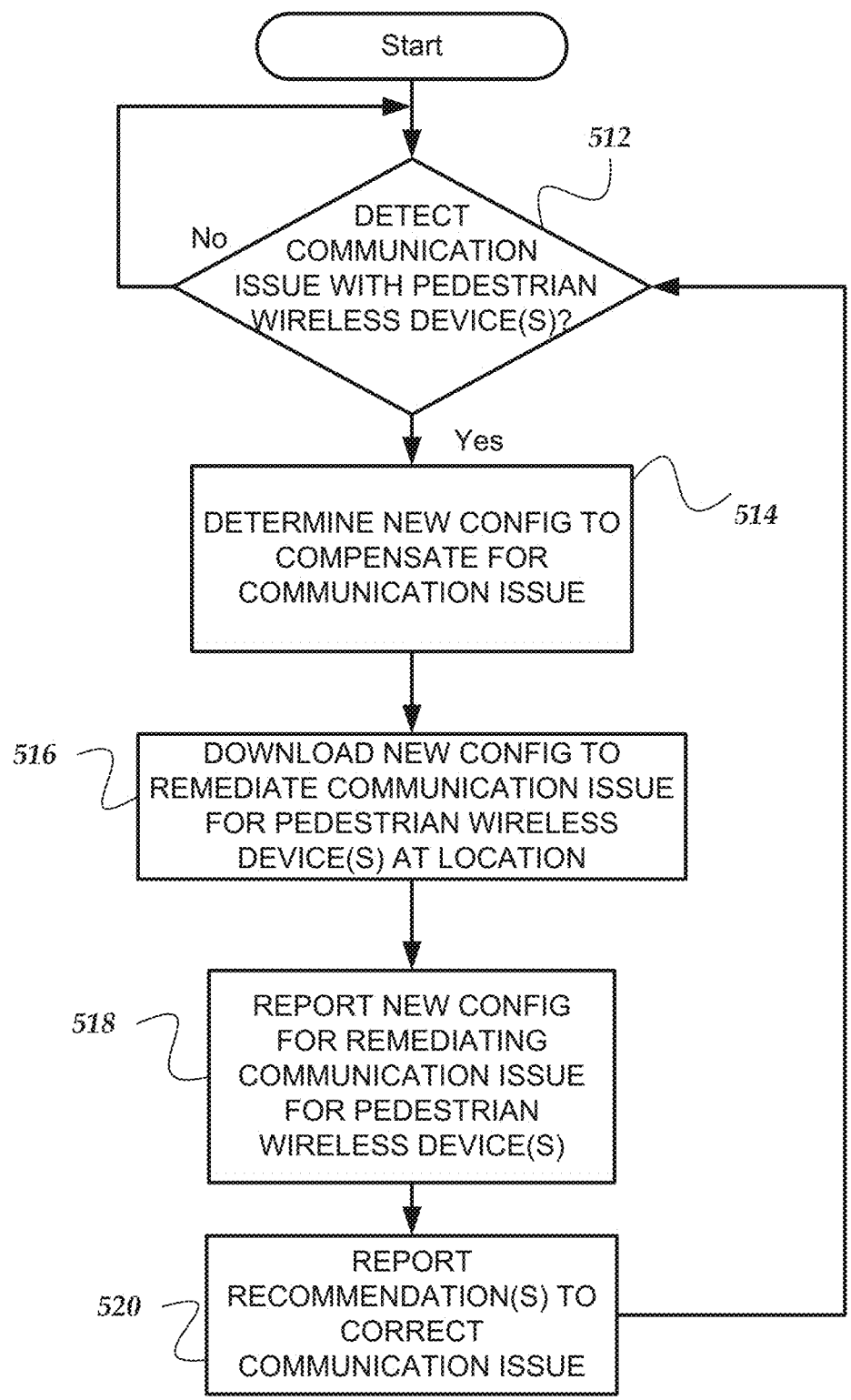
FIG. 5B shows a flow diagram for a process for detecting an issue in wireless communication with wireless devices employed by pedestrians at a location, and determining a remediation for surface scattering antennas employed to provide wireless communication with the wireless devices at the location.

FIG. 5B illustrates a flow chart for a process for detecting an issue in providing wireless communication by one or more of the plurality of surface scattering antennas, and remotely determining a remediation that at least diminishes the issue in providing wireless communication for wireless devices. Moving from a start block, the process advances to decision block 412 to determine if diminished wireless communication is an issue for one or more of the plurality of surface scattering antennas that could be selected for wireless communication with wireless devices employed by pedestrians.

If the determination at decision block 412 is true, then the process advances to block 414 where different types of information are remotely employed to determine one or more new configurations for one or more of the plurality of surface scattering antennas to compensate for the wireless communication issue. The different types of information may include correlations, causations, or other relevant data for the wireless communication issue, such as anomalies in surface scattering antenna performance, holidays, current events, load balancing information, topology of the plurality of surface scattering antennas, flight plans, highway maps, train track maps, previously detected wireless communication interference for one or more surface scattering antennas, weather events, maintenance events, damage to one or more of the surface scattering antennas, or any other third party information. The new configuration may include new determined waveforms for selected surface scattering antennas, preventing one or more of the surface scattering antennas from being selected to provide wireless communication with the wireless devices employed by the pedestrians, or the like.

At block 516, the new configuration is downloaded to at least a portion of the plurality of surface scattering antennas to provide remediation for the issue in providing wireless communication between a selected surface scattering antenna and a moving vehicle on the path. Next, at block 518, a report is provided to a user, such as a system administrator, that a wireless communication issue was detected and a new configuration for one or more of the surface scattering antennas was downloaded and installed at one or more of the surface scattering antennas.

At block 520, an evaluation is made to create recommendations to correct the issue so that the new configuration is no longer needed. For example, if the issue is determined to be a power outage, a structure (building, tree) is blocking the full operation of a particular surface scattering antenna, or a bird has defecated on a surface of a surface scattering antenna, or the like, then a recommendation to send out a maintenance technician to correct this type of issue is provided to a system administrator. Next, the process looks back to decision block 512 where substantially the same actions are performed again.

Additionally, in one or more embodiments, the determination of new configuration may be performed locally by one or more surface scattering antennas, or in combination with remote resources such as a cloud computing system, an edge computing resource, a remote server computer, or the like over a network.

Figure 6A:
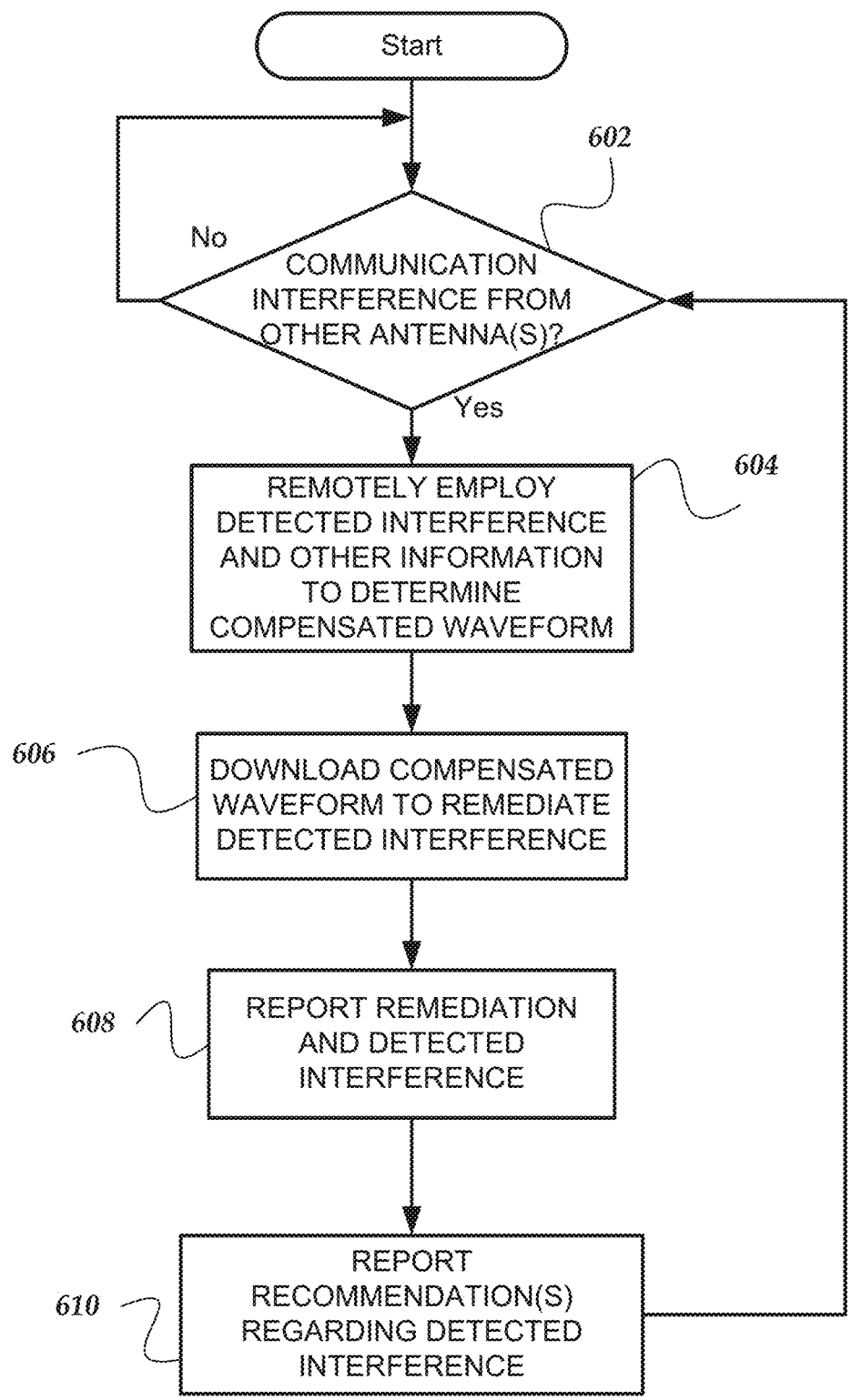
FIG. 6A illustrates a flow diagram for a process for determining an overload load issue in wireless communication, between a surface scattering antenna and wireless devices employed by pedestrians and/or vehicle passengers, and determining one or more other surface scattering antenna to share the load in the wireless communication to improve wireless communication with the wireless devices.

FIG. 6A shows a flow chart for a process for determining interference in wireless communication between a surface scattering antenna and a moving vehicle. Moving from a start block, the process advances to decision block 602 where a determination is made whether interference is detected in wireless communication provided by one or more of a plurality of surface scattering antennas. If the true, the process steps to block 604 where the detected wireless signal interference from a third party's antenna or another of the plurality of surface scattering antennas is compensated for by creating a null or zero in the selected surface scattering antenna's waveform. The compensated waveform enables a selected surface scattering antenna to communicate over one or more beams of wireless signals that avoid the physical location of the wireless signal interference. Also, the determined compensation waveforms can be quickly changed to create nulls around intermittent, temporary or permanent interferences. Additionally, in one or more embodiments, the determination of new configuration may be performed locally by one or more surface scattering antennas, or in combination with remote resources such as a cloud computing system, an edge computing resource, a remote server computer, or the like over a network.

Next, at block 606, the compensated waveform is provided to a selected surface scattering antenna and locally used by the selected surface scattering antenna to generate one or more waveform beams of wireless signals that are configured to remediate the detected interference by another antenna. Additionally, at block 608, the detected interference and the remediation provided by the one or more compensation waveforms that is provided to one or more selected surface scattering antennas is reported to a system administrator.

At block 610, an evaluation is made for one or more recommendations to correct the interference that may have one or more causes, e.g., a third party's antenna or one or more of the plurality of surface scattering antennas. Also, the recommendations may include changing a topology of the plurality of surface scattering antennas, changing a physical arrangement of one or more of the plurality of surface scattering antennas, or providing maintenance to one or more of the plurality of surface scattering antennas. Additionally, in one or more embodiments, one or more maps of detected interferences can be provided to a system administrator/user to further inform understanding of the severity of problems caused by detected interferences. Next, the process loops back to decision block 602 to perform substantially the same actions.

Figure 6B:
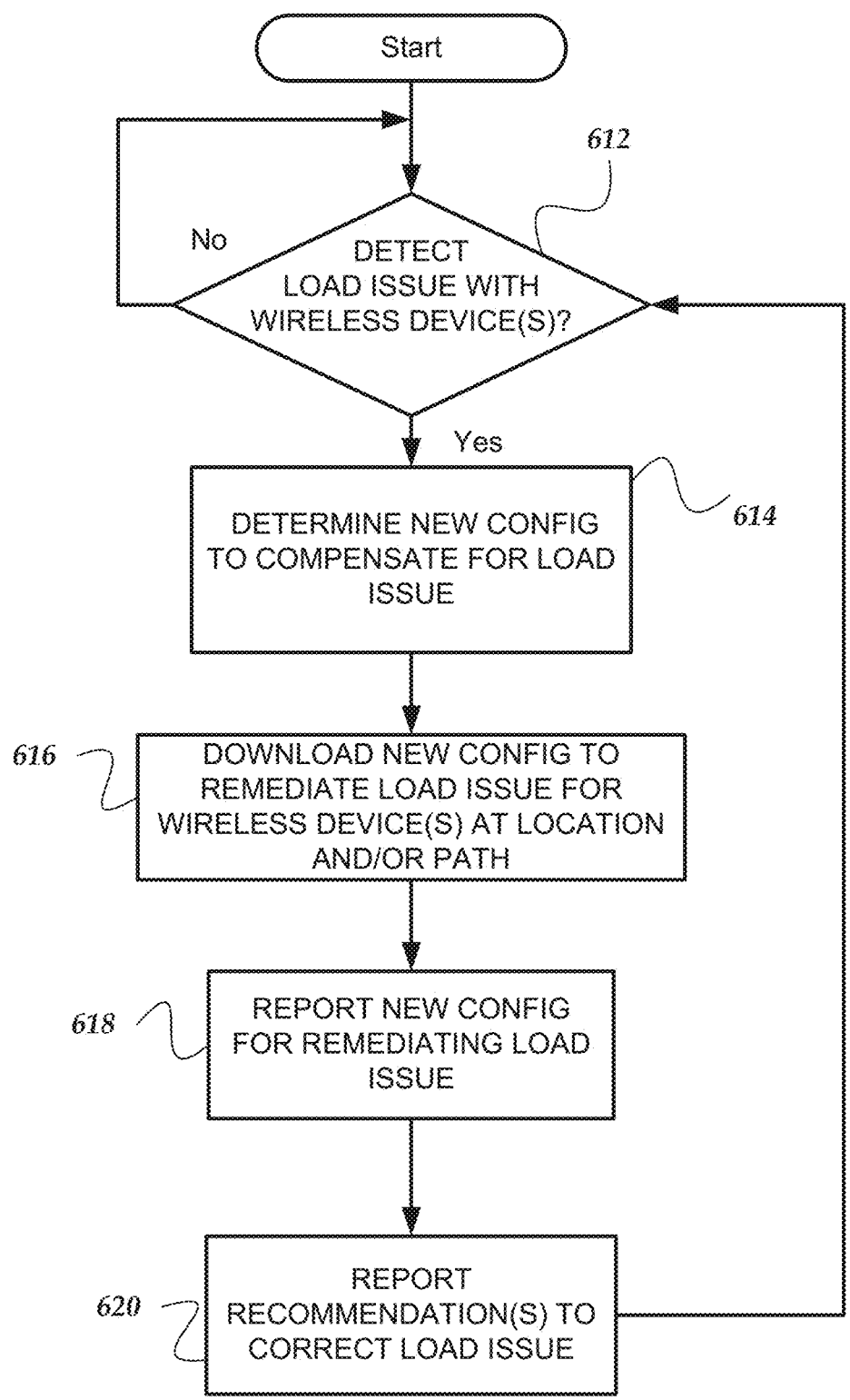
FIG. 6B shows a flow diagram for a process for determining interference in wireless communication, between a surface scattering antenna and one or more other antennas, for wireless devices employed by users, and determining an adjustment to the waveform to compensate for the interference and improve the wireless communication between the surface scattering antenna and the wireless devices in the moving vehicle.

FIG. 6B shows a flow chart for managing a number of wireless devices that are provided wireless communication (load) by two or more of a plurality of surface scattering antennas. Each of these surface scattering antennas may have a same or different capability to provide wireless communication to wireless devices employed by pedestrians, passengers or vehicles. The capabilities may be based on one or more characteristics, e.g., amount of bandwidth, type of connectivity, one or anomalies in surface scattering antenna performance, type and/or model of surface scattering antenna, mechanical damage, electronic damage, maintenance, weather, temperature, antenna interference, or the like.

Moving from a start block, the process advances to decision block 612, where a determination is made as to whether one or more of the surface scattering antennas is likely to be, or is currently, unable to manage it's currently configured load of wireless devices that are provided wireless communication. If the determination is affirmative, for one or more surface scattering antennas, the process steps to block 614 where a new configuration is determined that moves some, or all, of the overload of wireless devices to one or more other surface scattering antennas that are not currently overloaded. One or more load balancing methods may be employed to select one or more other surface scattering antennas to take over providing wireless communication to the overload wireless devices.

Moving to block 616, the new configuration is provided to both the one or more overloaded surface scattering antennas and one or more selected load balancing other surface scattering antennas. Stepping to block 618, a report of the new load balancing configuration is provided to a user, such as a system administrator, that a load balancing issue was detected and a new configuration for one or more of the surface scattering antennas was installed.

At block 620, an evaluation is made to create recommendations to correct the load balancing issue so that the new load configuration is no longer needed. Next, the process looks back to decision block 612 where substantially the same actions are performed again.

Additionally, in one or more embodiments, the determination of new load balancing configuration may be performed locally by one or more surface scattering antennas, or in combination with remote resources such as a cloud computing system, an edge computing resource, a remote server computer, or the like over a network.

Illustrative Logical System Architecture

Figure 7:
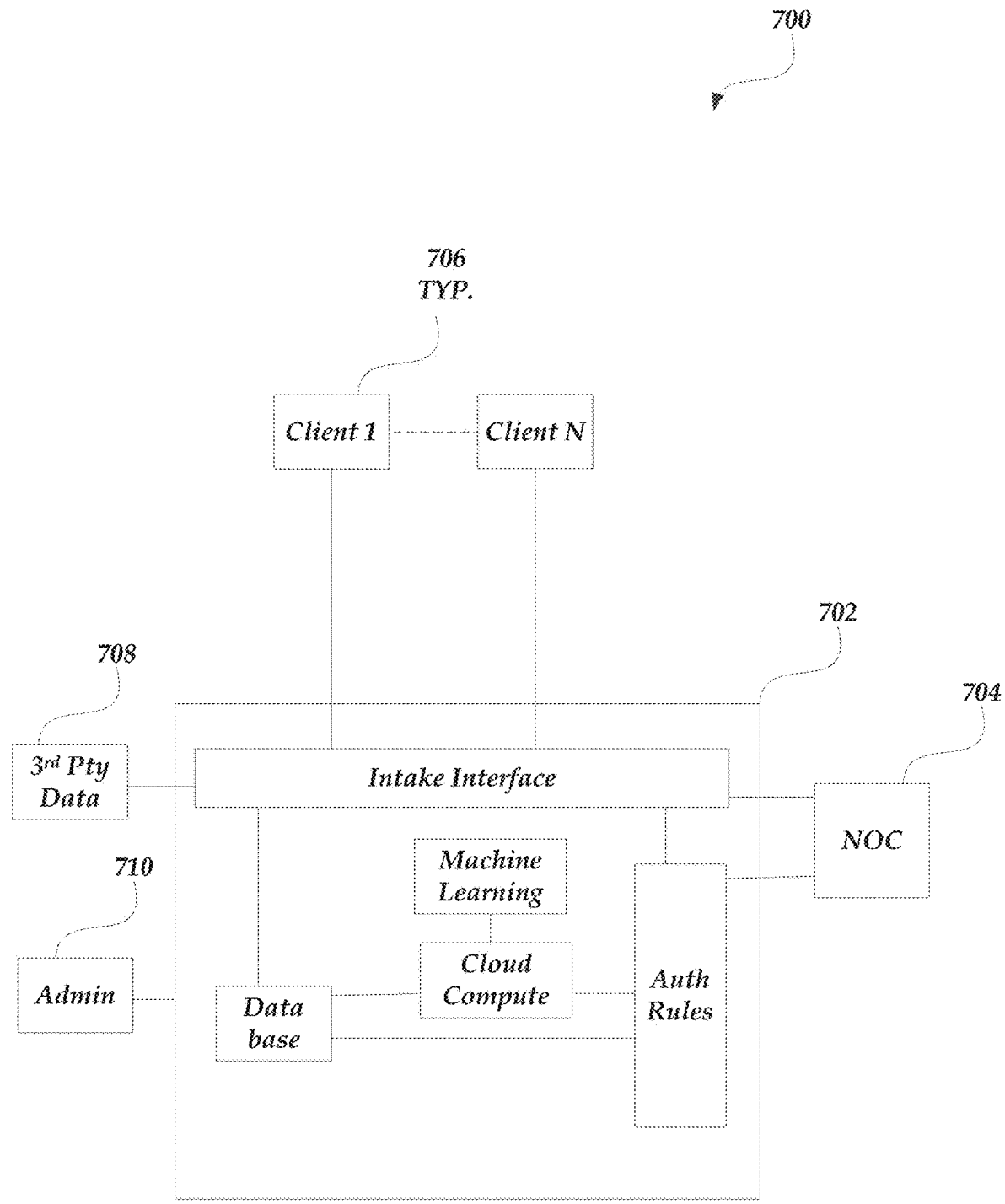
FIG. 7 illustrates a block diagram of a cloud computing system that enables the communication platform engine to provide improved wireless communication between clients (wireless devices employed by users in vehicles and/or wireless devices employed by pedestrians), network operation centers, administrators and other users in accordance with one or more embodiments of the invention.

FIG. 7 illustrates a block diagram of a remotely located exemplary computing system 700 that enables communication platform engine 702 to provide improved wireless communication between clients (vehicles and passenger's user devices), network operation centers, data centers, administrators and other clients. In one or more embodiments, system 700 may be integrated with a private or public cloud based system that manages wireless communication with clients over a plurality of wired and wireless networks.

The exemplary communication platform engine includes a plurality of modules including an intake interface module, one or more databases, a machine learning module, a cloud computer module, and an authorization module. The authorization module employs rules that control access by clients 706, network authorization centers 704, system administrators 710, third party data sources 708, or the like to the communication platform. The exemplary communication platform engine is operable to manage hand offs between surface scattering antennas providing wireless communication to moving vehicles, waveform optimization to improve wireless communication, waveform beam interference remediation, alerts, notifications, reports, recommendations, load balancing of load on the plurality of surface scattering antennas, on demand sharding of computing resources to reduce latency for real time actions, and provide higher latency for non-real time actions.

In one or more embodiments, multiple instances of the communication platform engine may be provided. Regional communication platform engines may be instantiated physically close to a plurality of paths traveled by moving vehicles to reduce latency for certain types of actions, such as determining a particular waveform for a selected surface scattering antenna to improve wireless communication with a moving vehicle currently traveling along a path. For example, when an aircraft is detected providing wireless communication signals by one or more of the plurality of surface scattering antennas, the communication platform may identify a direction, distance, and speed of the aircraft, and then download determined waveforms and hand off times to selected surface scattering antennas located along a path on the earth that the aircraft is likely to continue traveling in parallel on its flight path.

Also, in one or more embodiments, other instances of communication platform engines may be instantiated physically remote to a plurality of paths traveled by moving vehicles to provide certain types of determinations, such as recommendations to remediate communication issues, wireless signal interferences, load balancing of wireless communication handled by the plurality of surface scattering antennas, optimization of topology of the network for the plurality of surface scattering antennas, maintenance issues, or the like.

In one or more embodiments, the machine learning module may employ historical data to optimize one or more models to quickly identify a first choice to improve the wireless communication with a vehicle and the plurality of surface scattering antennas. For example, a first choice from the plurality of surface scattering antennas to be selected for providing wireless communication with a moving vehicle traveling along a path. Also, one or more models may provide a first choice for a determined waveform provided to the selected surface scattering antenna. Further, the one or more models may provide a first choice compensation waveform to the selected surface scattering antenna to remediate wireless signal interferences. It is understood that as the machine learning module examines more and more historical data, many other types of models will be created to improve the wireless communication between the plurality of surface scattering antennas and moving vehicles.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In at least one embodiment, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method, comprising:
    detecting an adverse issue in providing wireless communication to a plurality of wireless devices by one or more holographic beamforming antennas;
    employing one or more machine learning engines to preselect a configuration of a holographic beamforming antenna for a likely location of each of the plurality of wireless devices;

determining one or more new configurations for one or more new shapes for one or more beam waveforms emitted by the one or more holographic beamforming antennas to provide a remediation that compensates for the adverse wireless communications issue, wherein the determination of the one or more new configurations is based on non-load balancing information provided by the one or more machine learning engines and one or more of a correlation to the issue or a causation of the issue; and downloading the one or more new configurations to the one or more holographic beamforming antennas to emit the one or more beam waveforms having the one or more new shapes.

2. The method of claim 1, wherein the detected adverse issue further comprises a load balancing issue.

3. The method of claim 2, wherein the one or more new configurations include a new configuration that moves an overload of wireless devices serviced by an overloaded holographic beamforming antenna to one or more holographic beamforming antennas that are not overloaded.

4. The method of claim 2, wherein the one or more new configurations include a new configuration proportionally balancing a load between two or more of the holographic beamforming antennas according to load capabilities of the holographic beamforming antennas.

5. The method of claim 4, wherein the proportional balancing includes considering amounts of data communicated by each wireless device serviced by the one or more holographic beamforming antennas.

6. The method of claim 1, wherein the detected adverse issue includes a wireless communications interference issue.

7. The method of claim 6, wherein the one or more new configurations include a new configuration that provides a null or zero in a new shape for a beam waveform emitted by a selected holographic beamforming antenna to avoid a physical location of a wireless signal interference source.

8. The method of claim 6, wherein the one or more new configurations include one or more changes to the one or more new shapes of the one or more beam waveforms to mitigate interference.

9. The method of claim 6, wherein the wireless communications interference issue is an intermittent, temporary, or permanent wireless communications interference issue.

10. The method of claim 1, wherein the detected adverse issue is a presence of one or more physical obstructions that block or degrade a quality of wireless communication.

11. The method of claim 10, wherein the one or more physical obstructions include a building or tree.

12. The method of claim 10, wherein the one or more physical obstructions include bird defecations on one or more surfaces of the one or more holographic beamforming antennas.

13. The method of claim 1, further comprising:
reporting the detecting of the adverse issue and the remediation thereof.

14. The method of claim 1, further comprising:
creating a recommendation to correct the adverse issue so that the remediation is no longer needed.

15. The method of claim 1, wherein the determining is based on a machine learning model.

16. A network computer system, comprising:
a memory for storing instructions; and
one or more processors configured to execute the instructions to perform actions, including:
detecting an adverse issue in providing wireless communication to a plurality of wireless devices by one or more holographic beamforming antennas;
employing one or more machine learning engines to preselect a configuration of a holographic beamforming antenna for a likely location of each of the plurality of wireless devices;
determining one or more new configurations for one or more new shapes for one or more beam waveforms emitted by the one or more holographic beamforming antennas to provide a remediation that compensates for the adverse wireless communications issue, wherein the determination of the one or more new configurations is based on non-load balancing information provided by the one or more machine learning engines and one or more of a correlation to the issue or a causation of the issue; and
downloading the one or more new configurations to the one or more holographic beamforming antennas to emit the one or more beam waveforms having the one or more new shapes.

17. The system of claim 16, wherein the detected adverse issue further comprises a load balancing issue, a wireless communications interference issue, or a presence of one or more physical obstructions that block or degrade a quality of wireless communication.

18. The system of claim 16, wherein the determining is based on a machine learning model.

19. The method of claim 16, wherein the network computer system further comprises a cloud computing system.

20. A computer-readable non-transitory media that includes instructions for a network computer system to perform actions, including:
detecting an adverse issue in providing wireless communication to a plurality of wireless devices by one or more holographic beamforming antennas;
employing one or more machine learning engines to preselect a configuration of a holographic beamforming antenna for a likely location of each of the plurality of wireless devices;
determining one or more new configurations for one or more new shapes for one or more beam waveforms emitted by the one or more holographic beamforming antennas to provide a remediation that compensates for the adverse wireless communications issue, wherein the determination of the one or more new configurations is based on non-load balancing information provided by the one or more machine learning engines and one or more of a correlation to the adverse issue or a causation of the adverse issue; and
downloading the one or more new configurations to the one or more holographic beamforming antennas for emitting the one or more beam waveforms having the one or more new shapes.

* * * * *